(12) United States Patent
Misra et al.

(10) Patent No.: US 11,836,754 B2
(45) Date of Patent: Dec. 5, 2023

(54) ELECTRONIC COUPON MANAGEMENT

(71) Applicant: PAYPAL, INC., San Jose, CA (US)

(72) Inventors: Navendu Misra, Austin, TX (US); Alexis Puchek, Austin, TX (US); Nicole L Stuard, Pflugerville, TX (US); Jason M. Diaz, Austin, TX (US); John J. Neff, Round Rock, TX (US); Alicia D. Jones, Cedar Park, TX (US)

(73) Assignee: PAYPAL, INC., San Jose, CA (US)

( * ) Notice: Subject to any disclaimer, the term of this patent is extended or adjusted under 35 U.S.C. 154(b) by 123 days.

(21) Appl. No.: 16/877,939

(22) Filed: May 19, 2020

(65) Prior Publication Data

US 2021/0042776 A1  Feb. 11, 2021

Related U.S. Application Data

(63) Continuation of application No. 15/163,623, filed on May 24, 2016, now Pat. No. 10,657,550, which is a continuation of application No. 13/730,448, filed on Dec. 28, 2012, now abandoned.

(60) Provisional application No. 61/580,950, filed on Dec. 28, 2011.

(51) Int. Cl.
*G06Q 30/0207* (2023.01)
*G06K 7/10* (2006.01)
*G06K 7/14* (2006.01)

(52) U.S. Cl.
CPC ..... *G06Q 30/0222* (2013.01); *G06K 7/10722* (2013.01); *G06K 7/1408* (2013.01)

(58) Field of Classification Search
CPC ........... G06Q 30/0236; G06Q 30/0237; G06Q 30/0238; G06Q 30/0234; G06Q 30/0222; G06K 7/10722; G06K 7/1408

USPC ....................... 709/217; 705/14.27
See application file for complete search history.

(56) References Cited

U.S. PATENT DOCUMENTS

| | | | |
|---|---|---|---|
| 5,644,723 A | 7/1997 | Deaton et al. | |
| 5,905,246 A | 5/1999 | Fajkowski | |
| 7,555,444 B1 | 6/2009 | Wilson et al. | |
| 2002/0161640 A1 | 10/2002 | Wolfe | |
| 2004/0049427 A1* | 3/2004 | Tami ...................... | G06Q 30/02 705/24 |
| 2004/0117255 A1* | 6/2004 | Nemirofsky ....... | G06Q 30/0269 705/14.66 |
| 2005/0021664 A1* | 1/2005 | Bennett ................. | H04M 7/003 709/217 |
| 2005/0071227 A1* | 3/2005 | Hammad ............... | G06Q 30/02 705/14.27 |

(Continued)

OTHER PUBLICATIONS

Karen J. Detoro, Managing Risks in Incentive Compensation Plans, 2011 (Year: 2011).*

(Continued)

*Primary Examiner* — Tarek Elchanti
(74) *Attorney, Agent, or Firm* — Haynes and Boone, LLP

(57) ABSTRACT

Methods and systems are provided for electronically managing coupons. The user no longer has to clip and organize coupons. The need for hand processing of coupons is substantially reduced. Rebates or payments for coupons can be substantially hastened and can be deposited directly into a user's bank, credit card, or payment provider account. Merchants and manufactures no longer have to be concerned with receiving bad (e.g., invalid, expired, or counterfeit) coupons. Thus, the electronic coupon management system benefits the users, merchants, and manufactures.

20 Claims, 18 Drawing Sheets

(56) References Cited

U.S. PATENT DOCUMENTS

| | | | |
|---|---|---|---|
| 2005/0131761 A1* | 6/2005 | Trika | G06Q 30/0269 705/14.27 |
| 2005/0228719 A1 | 10/2005 | Roberts et al. | |
| 2006/0119900 A1 | 6/2006 | King et al. | |
| 2009/0144164 A1 | 6/2009 | Wane et al. | |
| 2009/0234731 A1 | 9/2009 | Mariotti | |
| 2011/0125561 A1 | 5/2011 | Marcus | |
| 2012/0084135 A1* | 4/2012 | Nissan | G06Q 30/0238 705/14.38 |
| 2012/0136698 A1 | 5/2012 | Kent | |
| 2012/0303438 A1* | 11/2012 | Futty | G06Q 30/0234 705/14.34 |
| 2013/0054336 A1* | 2/2013 | Graylin | G06Q 40/02 705/21 |
| 2016/0104189 A1 | 4/2016 | Marcus | |
| 2016/0267512 A1 | 9/2016 | Misra et al. | |

OTHER PUBLICATIONS

Evans, Matt, "Bargain business: Inmar boosted by digital coupons, pharma", The BusinessJournal, May 27, 2011, 3 pages [online], [retrieved on May 1, 2013]. Retrieved from the Internet: <URL: http://www.bizjournals.com/triad/print-edition/2011/05/27/bargain-business-inmar-boosted-by.html?s=print>.

Hale, Todd, "The Coupon Comeback", nielsen, Apr. 13, 2010, 7 pages [online], [retrieved on May 1, 2013]. Retrieved from the Internet: <URL: http://www.nielsen.com/us/en/newswire/2010/the-coupon-comeback.html>.

Bodhani, A., 2012. Much more touch [The role of POS systemsin providing customer satisfaction and retail revenue generation]. Engineering & Technology, 7(8), pp. 48-51. (Year: 2012).

Kumar, M., Rangachari, A., Jhingran, A. andMohan, R., Aug. 1998, Sales promotions on the Internet. In 3rd USENIX Workshop on Electronic Commerce (pp. 167-176). (Year: 1998).

* cited by examiner

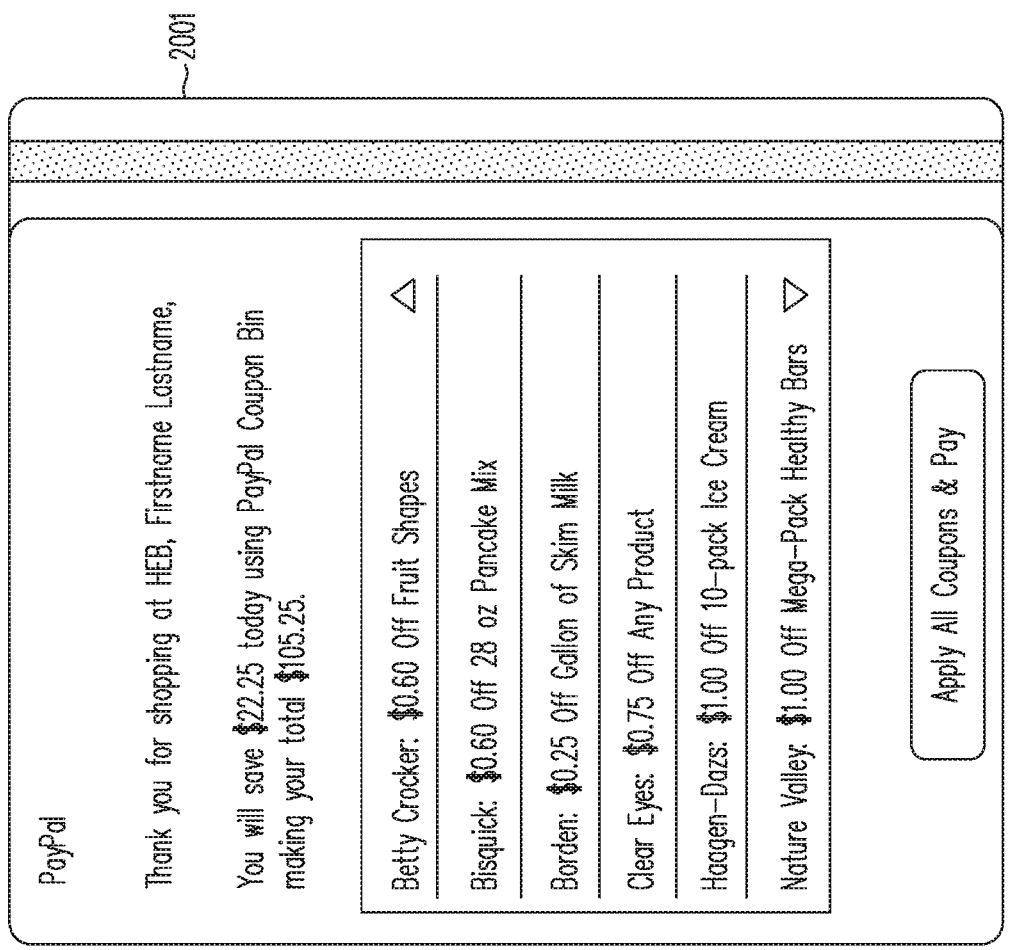
FIG. 18
FIG. 20
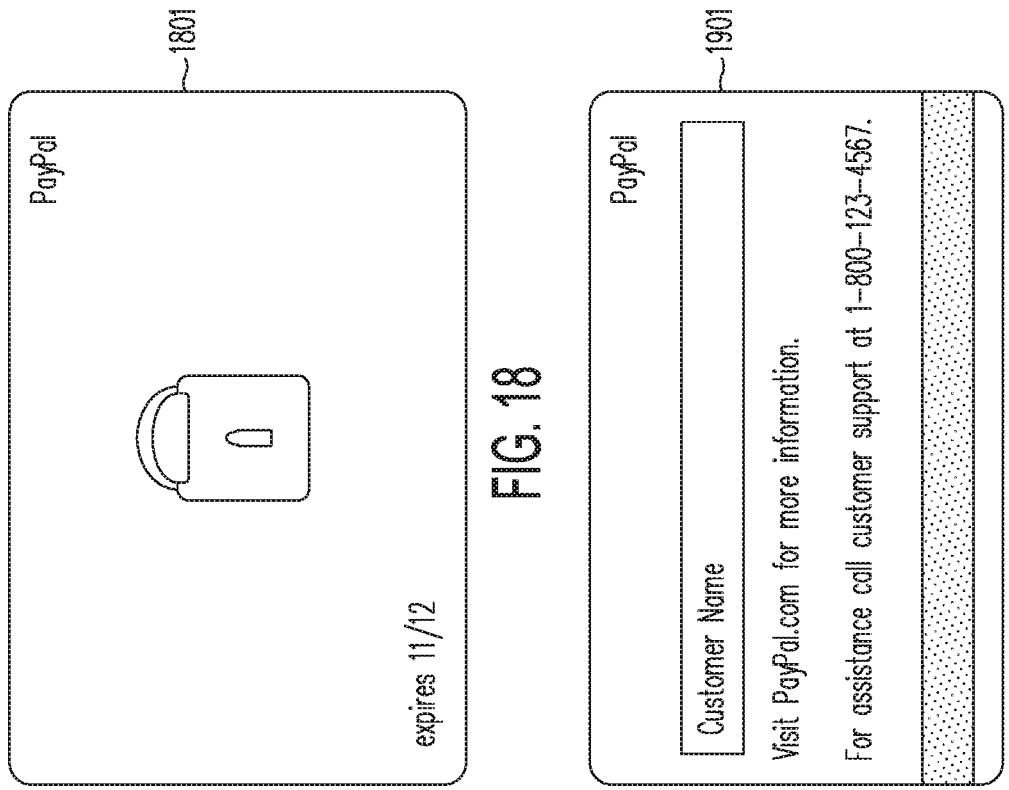
FIG. 19

FIG. 24

Sign your name and press enter.

| 1 | 2 | 3 | 4 |
| 5 | 6 | 7 | 8 |
| 9 | 0 | Cancel | Enter |

FIG. 25

Store Receipt
1234 Fake Street
Austin, TX 75751
512 123-4567

Store: 0003  Register: 001
Cashier: Katie
Associate: 0000000

| Fishing Pole | 299.00 |
| Tackle Box | 22.50 |
| Fishing Line | 2.30 |
| Energy Drink | 4.25 |
| Life Vest | 44.99 |

| Raw Sales Price | 374.03 |
| Less Total Discounts | 35.50 |

| Grand Total | 338.53 |
| Total Discounts | 35.50 |

*Thank You*

FIG. 26

FIG. 27 paypal.com

My Account

History

Transaction Details

Point of Sale Payment Made (Unique Transaction ID # 54FRAM576DFAJKFA88)

Original Transaction

| Date | Type | Payment Status | Coupon Bin Savings | Gross |
|---|---|---|---|---|
| Aug 29, 2011 | POS | Completed | $35.50 | -$338.53 |

Point of Sale Payment Made To: Store Name
Address: 1234 Fake Street,
Austin, Texas 78751

Original Total: -374.03
Coupon Bin Savings: +35.50
Amount Paid: -338.53

Date: Aug 29, 2011
Status: Completed

ELECTRONIC COUPON MANAGEMENT

PRIORITY CLAIM

This patent application is a continuation of U.S. patent application Ser. No. 15/163,623, filed May 24, 2016, which is a continuation of U.S. patent application Ser. No. 13/730, 448, filed Dec. 28, 2012, which claims the benefit of the priority date of U.S. Provisional Patent Application No. 61/580,950, filed on Dec. 28, 2011, all of which are hereby expressly incorporated by reference.

BACKGROUND

Technical Field

The present disclosure generally relates to electronic commerce and, more particularly, relates to methods and systems for electronically capturing, storing, and/or redeeming coupons.

Related Art

Coupons for use in shopping are well known. Such coupons typically provide discounts to customers when the customers purchase products from a particular merchant. For example, a coupon can offer ten percent off of the regular purchase price if the product is purchased prior to a specified date. As a further example, the coupon can offer multiple products for the price of one product, such as two for the price of one. As yet a further example, the coupon can offer a free product (generally of lesser value) with the purchase of another product (generally of greater value) at the regular price, such as a free toolbox with a set of mechanic's tools. Coupons can also offer rebates.

Although such coupons have desirable benefits, they suffer from substantial deficiencies. For example, the coupons must be obtained, organized, stored, and redeemed in order to provide the benefits.

BRIEF DESCRIPTION OF THE DRAWINGS

FIGS. 5-27 are examples of coupons, messages, screen displays, and the like for use in the system for electronic coupon management, according to an embodiment.

DETAILED DESCRIPTION

Figure 1:
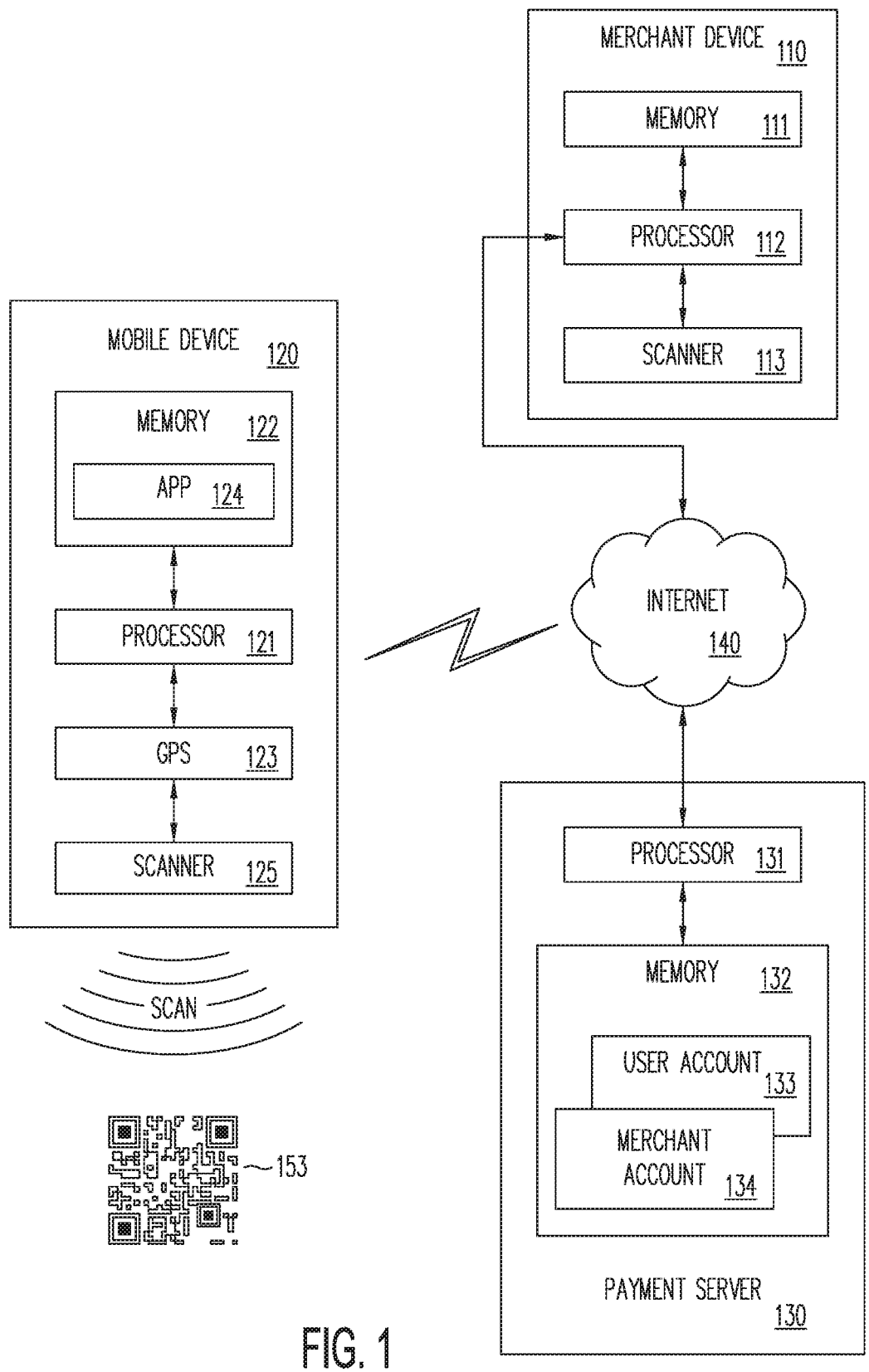
FIG. 1 is a block diagram of a system for electronic coupon management, according to an embodiment.

Methods and systems for electronically acquiring, storing, organizing, and/or redeeming coupons are provided. According to an embodiment, a service or payment provider can manage coupon acquisition, organization, storage, and use for users and can also manage coupon redemption for merchants and manufacturers. Coupon acquisition, organization, storage, and use can be managed by a mobile device of the user, by a merchant device, and/or by a server, such as a server of the payment provider.

The user is not required to find, clip, and organize coupons. The need for hand processing of coupons, such as by the merchant and manufacturer, can be substantially reduced or eliminated. Rebates or payments for coupons can be substantially hastened and can be deposited directly into a user's or merchant's bank, credit card, and/or payment provider account. Merchants and manufacturers no longer have to be concerned with receiving bad (e.g., invalid, expired, or counterfeit) coupons. The system can be configured to accept only good, e.g., legitimate and valid, coupons. The system can be configured to accept bad coupons as well, if desired (such as on a discretionary basis for customer goodwill). Thus, the electronic coupon management system benefits the users, merchants, and manufacturers.

The system can organize the coupons. For example, the system can organize the coupons by product, manufacturer, category, expiration date, or user defined criteria. The system can organize the coupons according to any desired criteria. The coupons can be filtered such that only desired coupons are stored.

The user, via a mobile device such as a smart phone, can acquire, accumulate, filter, organize, and store coupons, such as into the user's digital wallet, for example. The coupons can be stored on another device, on a website of the system, or anywhere else. The user's digital wallet can be on the user's mobile device, in a mobile app, on a website, in a token (such as a hardware token), or in the user's account with the service provider, for example. The user's digital wallet can be on, in, or associated with any desired device, account, person, business, or other entity.

Coupon acquisition can be performed through scanning, automatically by a payment provider such as PayPal, Inc., and/or by manual input. For example, the user can scan specific coupons from newspapers, magazines, and the like. The user scans a single image (such as a QR code or bar code) to download one, a plurality, or all of the coupons associated with or located in a document or publication. The publication can be a hard copy document (such as a newspaper or magazine) or can be a digital document (such as from an email or web page). Thus, the user can scan a single image to download all of the coupons associated with a webpage or website. Scanning can store information regarding or representative of the coupon, such as a coupon code or a social code (e.g., a social media code).

When one coupon is scanned by the user, the system can attempt to locate other coupons for the same product or a similar product. The system can attempt to locate the other coupons in the same publication, in one or other publications, on the Internet, or anywhere else. The user or an administrator can designate where the system is to look for such coupons.

For example, the user can request the system to attempt to find a better deal on the same product anywhere that such a deal can be found by the system. The user or an administrator can have configured the system to review all available publications, query all participating merchants, and search the World Wide Web for such coupons.

A better deal can be a better discount (such as 30% off instead of 25% off), a longer duration for the coupon, an upgraded product, a product that includes another product for the same or a lower price, or a plurality of coupons that can be used together, for example. The criteria for a better deal can be defined by the user, such as during a setup process.

The user can place limits on the system's ability to attempt to find the better deal. For example, the system can be limited to finding coupons for use only at stores within a predefined geographic location. The predefined geographic location can be within a predefined distance from a location of the user, within a predefined distance from a location of the user's home, within a predefined distance of the user's workplace, within a predefined city, state, country, area code, zip code, or the like. Similarly, the system can be limited to finding coupons for use only within a predefined period of time. For example, the system can be limited to finding coupons that don't expire before Christmas. The system can continue to search for the better deal up until the time that the coupon is used. The user can define such limits during a setup process or substantially in real time.

The user can be presented with the best deal available. This can be done immediately, such as right after the best deal is found. This can be done when the user is making a purchase which can use the coupon. This can be done when the user requests the best deal available. When it is not clear which deal is the best (such as when one coupon offers a better discount and another coupon offers a different product for free if the desired product is purchased), then the user can be presented with all such ambiguous deals and can selected the desired coupon.

The user can acquire coupons into a digital wallet, such as by selecting coupons from publications or online. The user can also be sent coupons, such as to the user's mobile device, when the user enters a merchant's store. For example, the merchant can detect that the user is within or near the merchant's store and can download all or some of the merchant's coupons to the user's mobile device. As a further example, the merchant can detect that the user is spending time in a particular department or proximate particular merchandise and the merchant can send the user a coupon appropriate with respect to the department or product. Thus, such coupons can be available for the user to use, such as upon checkout from the merchant's store.

For coupon use or redemption, the payment provider can automatically apply coupons in the user's digital wallet to purchases made for the transaction. Alternatively, the user can be shown all available coupons for the purchase and can select one or more to apply for the purchase. The user can select whether or not coupon use is to be done automatically, such as at checkout, during a set up procedure of the system.

If the merchant does not have an account or is not otherwise associated with the payment provider, the payment provider, the user, and/or another entity can provide any applicable coupons after payment. The coupons can be presented to the merchant, a distributer, the manufacturer, or any other entity that will redeem or facilitate redemption of the coupons.

For example, the user can pay the full amount for the product at the merchant's point of sale (POS). After the purchase, the payment provider can determine what items were purchased and whether the user has or can obtain any coupons that can be used for the purchases. The payment provider can attempt to find coupons that can be used for the purchases. The payment provider can retroactively apply any such coupons. In this manner, the user can be uninvolved or less involved with coupon usage. For example, the user can merely designate that the user wants to participate in the payment provider coupon program and can thereafter generally ignore coupons altogether while benefiting therefrom.

As another example, if the user does not use an eligible coupon at the time of purchase such as because of forgetting the coupon, deciding not to use a coupon, or the merchant being unable or unwilling to process coupon, then the consumer can still use the coupon as long as any restrictions or conditions associated with such use are satisfied. The payment provider can determine if the purchase and conditions are okay and can process the coupon if they are okay. Thus, the use of coupons after the purchase can be facilitated. That is, a user can be allowed to apply coupons after the purchase so as to obtain a discount.

All available coupons can be applied to reduce the user's payment amount or the user can be presented with all available coupons for the purchase and the user can select desired ones to use. In this manner, the user can receive the maximum discount that is available. By providing such an ability to maximize the discount, use of the system as well as use of the payment provider, is encouraged.

According to an embodiment, coupon redemption by merchants is facilitated, such as by the payment provider. Once a coupon is applied to a user's purchase by the payment provider, the merchant then knows that the payment provider has confirmed that the coupon is valid and applicable. That is, the system, e.g., the payment provider, can confirm that the coupon is valid and applicable to the purchase before authorizing the purchase. The merchant can submit the coupon to the manufacturer via the payment provider. In this manner, the payment provider can instantly credit the merchant account. Thus, the merchant and/or the user do not need to wait for the manufacturer to provide the rebate. Thus, a substantial incentive is provided to encourage both merchant and user participation.

According to one or more embodiments, various features or advantages can be provided by the system, e.g., by the payment provider. For example, a coupon service can provide coupons to users. The coupons can be texted, emailed, mailed, provided on a website, or otherwise provided to the users. The coupons can be targeted or geared for usage based on the user's location, demographics, purchasing history, requests, and/or any other desired criteria.

Use of the payment provider herein is by way of example only, and not by way of limitation. Rather than a payment provider, various other entities can perform functions discussed herein with respect to the payment provider. For example, such functions can be performed by merchants, banks, credit card companies, and companies dedicated to such functions.

As a further example, the payment provider can function as a clearinghouse. For example, the payment provider can validate the coupons, apply discounts for the customer (such as at the POS or online), prevent multiple or unauthorized usage of coupons, prevent use of expired or invalid coupons, and reimburse the merchant for coupon purchases. As discussed herein, the merchants do not need to submit coupons to manufacturers and then wait for reimbursement, e.g., payment. Rather, the merchants can be credited immediately for coupons redeemed by the user. For example, the merchants can be credited immediately through the payment provider.

As yet a further example, rebate processing can be facilitated. The rebate can be a money amount provided as an incentive to the user after the purchase is made. Thus, the purchaser can pay the full amount or a discounted amount for a product and can, after the purchase, receive the rebate. A rebate can be anything of value, e.g., money, received by the purchaser after the purchase. According to an embodiment, the rebate can be provided to the user at the time of purchase.

As the rebate is validated and processed through the payment provider, instant notification (such as via an e-receipt) can be sent to the merchant and/or the manufacturer. The rebate can post substantially immediately on the merchant account. The payment provider can determine whether or not the user is required to wait a certain amount of time before the rebate is processed. Thus, at least in some instances, the user can receive the rebate promptly, e.g., immediately. The user can be required to wait a predetermined amount of time to avoid having the user receive the rebate and then return of item. Since there is no data generally stored on barcodes (this is why paper coupons have to be sent in), the payment provider can also become a database processor where relevant barcode information is stored and returned to the merchant and/or the manufacturer.

As yet a further example, GPS based, WHERE, in-store coupon targeting can be facilitated. Where, Inc. is a location based media company. Via the WHERE app, users can discover, save, and share local places. This is facilitated by providing the users with high quality local information regarding such local places. WHERE can provide promotional and discount offers from local merchants.

By using WHERE Inc. technology, the payment provider can push coupons (merchant and/or manufacturer) to users at particular locations. For example, a user shopping at a WHERE compatible store can automatically receive coupons for that store while the user is shopping there. The coupons can be sent to user's mobile device and can be filtered or otherwise processed so that the user can purchase products with the coupons immediately. Thus, the coupon push can be triggered by the user's presence at the store, such as while the WHERE application is running on the user's mobile device.

The user can scan a code, such as a QR code or barcode, at a merchant entrance or other location to get all coupons, rebates, or other offers that can be available for use for purchases made from the merchant. Such scanning can be performed via the user's mobile device or account. Thus, the coupon push can be triggered by the user scanning the code. The user can scan items for purchase and have the payment provider automatically provide all or some coupons to the purchased items. The coupons can be applied to the transaction at the POS or later within the user's account with the payment provider.

When the system is going to apply coupons to a purchase, the user can review and authorize such application of the coupons. The user can determine, such as on a coupon-by-coupon basis, which coupons are to be applied to a purchase. The use can add other coupons, such as coupons not known to the system, to the purchase.

As yet a further example, scanning of a barcode, a Universal Product Code (UPC), a near field communication (NFC) code, a quick response (QR) code, a dongle, or the like can be facilitated. For example, the system can facilitate the scanning of a barcode from user's mobile device or can facilitate the user's use of NFC or RFID to redeem a coupon. In the instances that barcodes cannot be scanned, the system can facilitate the use of NFC by a merchant's device to validate the user's mobile device. In this manner, the user can pay at the checkout counter with a credit card or other funding instrument. Thus, for example, the merchant device can scan the user's mobile device via NFC to determine what coupons the user has and to apply the coupons to the purchase during checkout.

In the event that a code, such as a barcode, cannot be scanned or the user does not have a mobile device, then the payment provider or the merchant can create and/or provide a dongle/device that will display scannable barcode. Such a device can be provided to the user by the payment provider and/or the merchant.

As yet a further example, the scanning and/or manual input of a barcode, UPC, NFC code, QR code or the like can be facilitated. Further, digitize paper coupons can be associated with a payment provider account. The payment provider can create sponsored coupons and QR codes, for example.

As yet a further example, a single QR code or the like in magazine, newspaper, other printed medium, or any other medium can be used to obtain all or a plurality of coupons, such as all of the coupons in the medium. For example, all of the coupons in the current issue of a magazine, all of the currently valid coupons in all issues of the magazine, all of the currently valid coupons in all of the magazines of a particular publisher, or all of the currently valid coupons in all of the magazines available can be obtained by scanning a single coupon in one magazine.

Thus, a single scan by a user can provide the user with a plurality of coupons. The plurality of coupons can be loaded into the user's mobile device and/or payment provider account. The user and/or the payment provider can selectively choose which of all the coupons are to be loaded so that the user is not flooded with coupons of no interest to the user. The user and/or the payment provider can selectively choose which of all the coupons are to be loaded according to any desired user provided or system provided criteria.

For example, the payment provider can filter out all coupons related to pets based on the user's history of never buying any pet-related items or services. The user can select categories of products for which the user does not wish to receive coupons. The payment provider can determine recent purchase history from the consumer and focus on coupons that relate to such purchases. The user can review stored coupons and can delete or add coupons thereto.

As yet a further example, two or more users can bump mobile devices, use NFC, or otherwise communicate to share coupons. For example, payment provider users can bump mobile devices to share coupons that can subsequently be passed to others such as other users of the same payment provider. Such sharing of coupons can be restricted, such as to users of a particular payment provider or such as to customers of a particular merchant. Such sharing of coupons can be unrestricted as to users. Coupons can also be shared using social networks. Coupons can be shared in any desired manner. For example, coupons can be shared via text messaging, email, blogs, or social networks.

Sharing coupons can involve copying the coupons. Sharing coupons can involve moving the coupons. A copied coupon is not deleted from the source and is provided to the recipient. Both the giver and the recipient can use the copied coupon. A moved coupon is deleted from the source and provided to the recipient. Only the recipient can use a moved coupon. Coupons can be designated or predefined as copyable or movable.

As yet a further example, marketing information such as buying patterns and coupon usage patterns of users can be provided by the system to merchants and manufacturers. Such information can be sold to merchants and manufacturers. Such information can include an identification of those specific users with respect to which the information was obtained or can omit such identification.

As yet a further example, manual receipt processing can be facilitated. For example, when a user makes a purchase, but the merchant is not a POS vendor, then the consumer and/or the merchant can take a picture of the bill. The bill can be parsed and/or sent to the payment provider for processing. This can be beneficial when the payment provider does not have itemized information available electronically.

Thus, the system can simplify coupon usage for the user and thus save the user money. The system can organize the coupons, such as by product, manufacturer, category, expiration date, or any other criteria. By doing so, the system can encourage the use of particular merchants and/or encourage the use of a payment provider. The system can also make it easier for merchants and manufacturers to run promotions. By making coupons easier to use, promotions involving coupons and the like can be easier to use as well.

According to an embodiment, advantage can be taken of information kept by a payment provider or the like regarding users. For example, such information can be used to automatically filter coupons. Only coupons of interest to the user, based at least in part upon the user's purchase history, can be stored. As a further example, user's having similar purchase histories (and thus presumably similar interests) can share coupons, such as automatically.

According to an embodiment, different levels of functionality can be provided by the system. For example, a first level can provide an ability to store and use coupons via the user's payment provider account. If the merchant does not support the payment provider's POS or does not have an account with the payment provider, then the user can submit coupons (such as coupons that the user desires to use for a purchase) through the payment provider directly to the manufacturer. In this manner, the user can redeem the coupons quickly and simply.

A second level can support merchants who don't have a payment provider POS system, but do have a payment provider account. If the merchant accepts a payment from the user via the payment provider account, the merchant would be able to simply process the coupons through the payment provider. The merchant saves time, paper, and inconvenience. The merchant is spared from having to argue with customers regarding the validity of coupons, since the payment provider can submit verification for a coupon and product directly to the manufacturer. The need to wait for weeks and send mail to redeem coupons can be eliminated. Merchants can get credited immediately for any coupons they receive.

A third level can include full integration. By using Where technology, GPS, and a payment provider POS system, the merchants can offer a simple and quick way for the user to save money, and for manufacturers to target their products. Customers could see all their coupons at check out, and pick and choose which coupons (or all of the coupons) they want to redeem. Users can see how much they saved. They can see which of the coupons in their coupon storage space, e.g., coupon bin, are supported by a particular merchant (such as the merchant where they are presently shopping or where they are considering shopping). Users can organize their coupons in order to enhance convenience while hopping.

According to an embodiment, a system can comprise one or more memories for storing an account of a user. The account can include coupon information for the user. One or more processors can be operable to receive a first communication. The first communication can include an indication of a desire of the user to purchase a product from a merchant. The one or more processors can be further operable to access the account of the user and determine, at least in part from the coupon information, if the user has any valid coupons for the product. If the user has one or more valid coupons for the product, then a second communication including information regarding the coupon(s) for the product can be sent to facilitate use of the coupon(s) to purchase the product.

The second communication can include a communication to the merchant. Thus, the merchant can apply the coupon(s) to the user's purchase of the product. In this manner, the user does not need to have the coupons. The user does not need to store the coupons on the user's mobile device, find the coupons, and give the coupons to the merchant.

The second communication can include a communication to the user. Thus, the user can give, e.g., communicate, the coupons to the merchant to apply the coupon(s) to the user's purchase of the product. In this manner, the merchant does not need to have the capability to receive the coupons from the system. The user can receive the coupons on the user's mobile device and can give the coupons to the merchant.

The account of the user can further include a purchase history for the user. The one or more processors can be further operable to use the purchase history to customize the information regarding coupons to provide customized coupon information. Thus, coupons based on the user purchase history can be kept by the system for the user. For example, if the user has a history of purchasing Red Sox sports memorabilia and attending Red Sox games, then coupons relating to the Red Sox can be kept by the system.

The system can search outside of the account for valid coupons for the product. Thus, when a purchase is being made, the system can search stored coupons for the product and can search non-stored coupons for the product. The system can, for example, search various publications, merchants, manufacturers, and/or the Internet for coupons for the product. In this manner, the system can attempt to reduce the purchase price for the product.

The one or more processors can be further operable to store all coupons of a publication in response to a request from the user to store one coupon in the publication. When the user selects on coupon of a publication to be stored, then either the selected coupon, all of the coupons of the publication, all of the coupons of the publisher, all of the coupons of the manufactures, all of the coupons for the product, all of the coupons for similar products, and/or all of the relevant coupons that can be found by the system can be stored.

The user can designate, such as in a set up proceed, whether or not and under what circumstances all if the coupons of a publication are to be stored. For example, the user can designate that all of the coupons for a particular publication, e.g., the Sunday newspaper, are to be stored when one of the coupons is scanned. The coupons can be filtered according to any criteria. For example, the user can designate during the set up procedure that only all of the sports related coupons are to be stored.

The coupons can be stored prior to storing the coupon information in the account. When all of the coupons of a publication or from any other source are stored, the coupons can be filtered. For example, when all of the coupons from a Sunday paper are to be stored, the coupons can first be filters to select only those coupons that relate to the Red Sox.

Rather than filtering to include according to a criteria, the system can exclude coupons according to a criteria. For example, if the user has no interest in pets, then any coupons that relate to pets can be excluded. Any combination of filtering to include and exclude can be used. The criteria for filtering can be provided by the user during a set up process, or can be provided substantially in real time.

According to an embodiment, a method can comprise storing, in a memory, an account of a user. The account can include coupon information for the user. The method can further comprise receiving, electronically by one or more processors, a first communication including an indication of a desire of the user to purchase a product from a merchant. The method can further comprise accessing, electronically by the one or more processors, the account of the user. The method can further comprise determining, electronically by the one or more processors and at least in part from the coupon information, if the user has any valid coupons for the product. The method can further comprise sending, electronically by the one or more processors, a second communication including information regarding the coupon(s) for the product to facilitate use of the coupon(s) to purchase the product.

According to an embodiment, a computer program product can comprise a non-transitory computer readable medium. The non-transitory computer readable medium can have computer readable and executable code for instructing one or more processors to perform any of the methods discussed herein.

FIG. 1 is a block diagram of a system for electronic coupon management, according to an embodiment. The system can include a merchant device 110. The merchant device 110 can be a merchant checkout terminal, a computer, and/or a server, for example. The merchant device 110 can include a memory 111 a processor 112, and a scanner 113. The merchant device 110 can be used for electronically managing coupon. For example, memory 111 can be used to store information regarding or representative of the coupons for a user. The processor 112 can be used to determine which of the user's and/or which of the merchant's coupons are applicable to a purchase of the user and to apply coupons to a purchase, and the scanner 113 can be used to scan coupons.

The system can include a mobile device 120. The mobile device 120 can be carried by the user. The mobile device 120 can be a cellular telephone, a smart telephone, a hand held computer, a laptop computer, a notebook computer, or a tablet computer, for example. The mobile device 120 can include a processor 121, a memory 122, and a global positioning system (GPS) 123, and a scanner 125.

The mobile device 120 can be used for routine telephone calls, text messaging, web browsing, and electronic coupon management. The memory 122 can be used to store information regarding or representative of the coupons the user. The processor 121 can be used to determine which of the user's and/or which of the merchant's coupons are applicable to a purchase of the user and to apply coupons to a purchase, and the scanner 125 can be used to scan coupons.

An app 124 can be stored in the memory 122 and executed by the processor 121. The app 124 can be used for electronic coupon management. The app 124 can be initiated, for example, by scanning a coupon. The app 124 can effect storing, organization, and use of coupons.

The system can include a server 131. The server 130 can be a server of a payment provider, such as PayPal, Inc. The server 130 can be a single server or can be a plurality of servers. The server 130 can include one or more processors 131 and one or more memories 132. The memory 132 can be a memory of the server 130 or a memory that is associated with the server 130. The memory 132 can be a distributed memory.

The server 130 can be used for electronic coupon management. The memory 132 can be used to store information regarding or representative of the coupons for each user, such as in the user accounts 133 thereof. The processor 131 can be used to determine which of the user's and/or which of the merchant's coupons are applicable to a purchase of the user and to apply coupons to a purchase.

The memory 132 can store a user account 133 and a merchant account 134. Coupons for the user can be stored in the user account 133. Coupons for the merchant can be stored in the merchant account 134. Coupons for the merchant can be copied from the merchant account 134 to the user account 133, such as for future or immediate use by the user.

Generally, the merchant device 110, the mobile device 120, and the payment server 130 can perform functions discussed herein. This is, to some extent, a function that is discussed herein as being performed on one of these device can be performed by a different one of these devices or by a combination of these devices. For example, information regarding or representative of the coupons for each user can be stored in the merchant device 110, the mobile device 120, and/or the payment server 130.

The merchant device 110, the mobile device 120, the other mobile devices 130, and the server 130 can communicate with one another via a network, such as the Internet 140. The merchant device 110, the mobile device 120, the other mobile devices 130, and the server 130 can communicate with one another via one or more networks, such as local area networks (LANs), wide area networks (WANs), cellular telephone networks, and the like. The merchant device 110, the mobile device 120, the other mobile devices 130, and the server 130 can communicate with one another, at least partially, via one or more near field communications (NFC) methods or other short range communications methods, such as infrared (IR), Bluetooth, WiFi, and WiMax.

FIG. 1 illustrates an exemplary embodiment of a network-based system for implementing one or more processes described herein. As shown, the network-based system can comprise or implement a plurality of servers and/or software components that operate to perform various methodologies in accordance with the described embodiments. Exemplary servers can include, for example, stand-alone and enterprise-class servers operating a server OS such as a MICROSOFT® OS, a UNIX® OS, a LINUX® OS, or another suitable server-based OS. It can be appreciated that the servers illustrated in FIG. 1 can be deployed in other ways and that the operations performed and/or the services provided by such servers can be combined or separated for a given implementation and can be performed by a greater number or fewer number of servers. One or more servers can be operated and/or maintained by the same or different entities.

Figure 2:
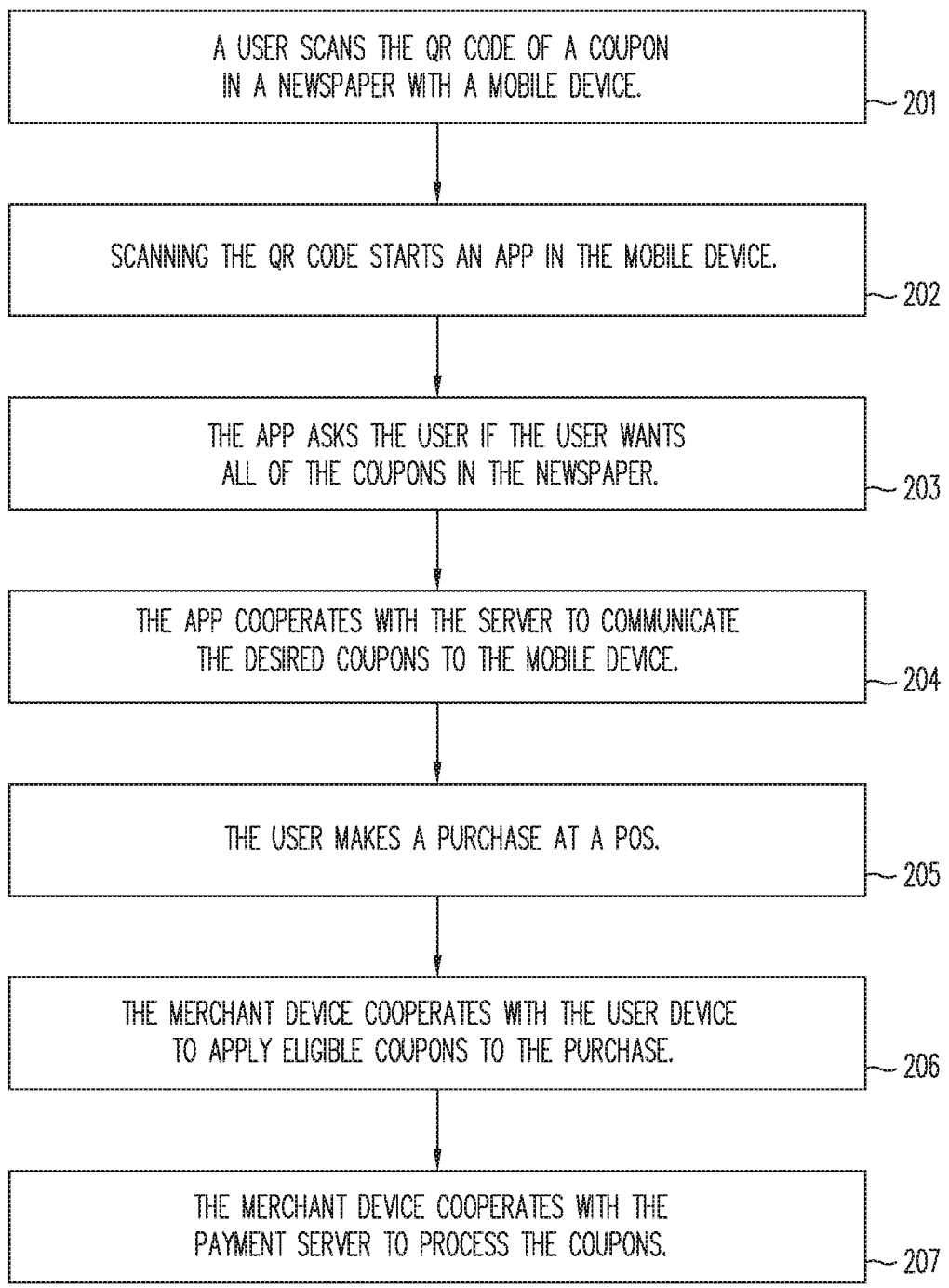
FIG. 2 is a flow chart of a method for electronic coupon management, according to an embodiment.
Figure 3:
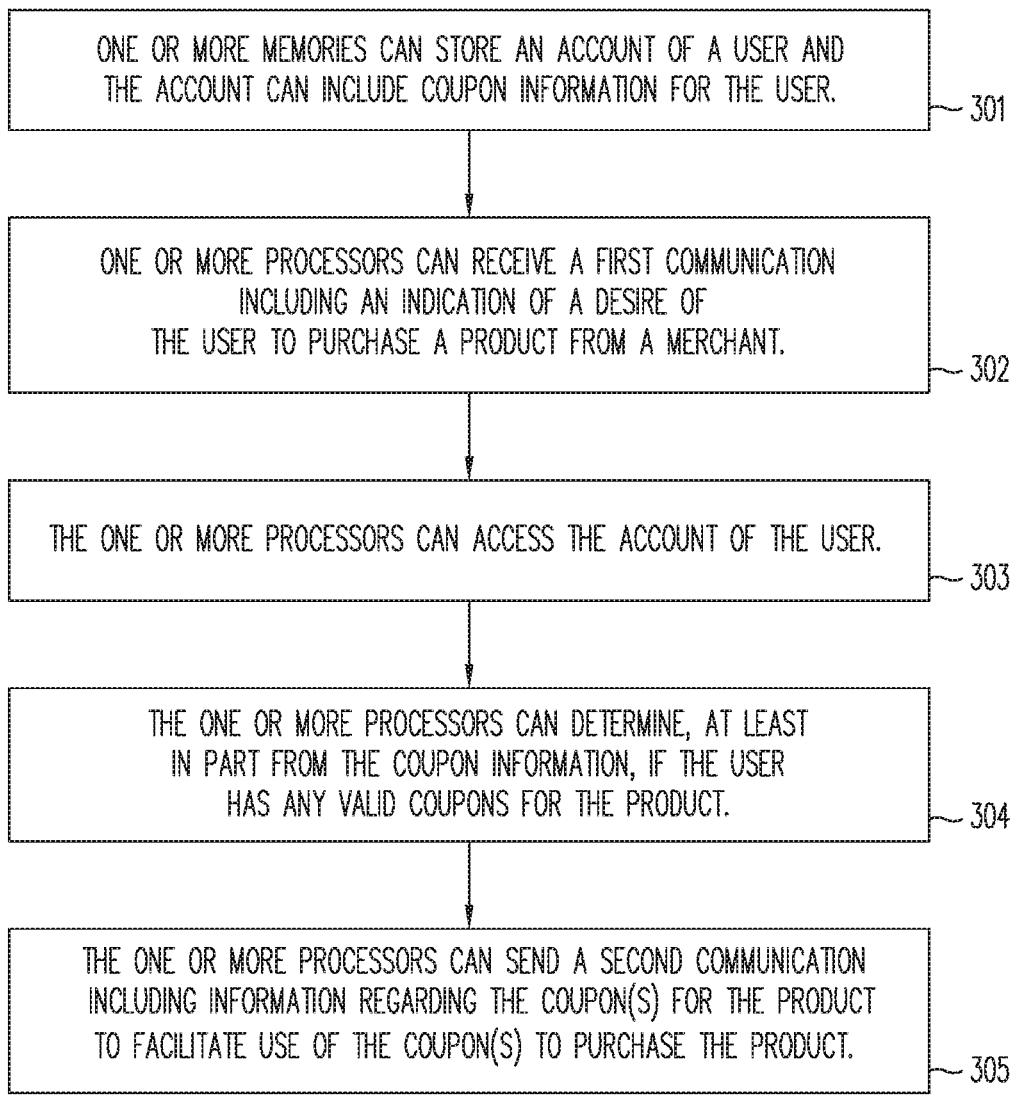
FIG. 3 is a flow chart showing further detail of the method for electronic coupon management, according to an embodiment.

FIGS. 2 and 3 are flow charts that describe examples of operation of the system for electronic coupon management, according to embodiments thereof. Note that one or more of the steps described herein can be combined, omitted, or performed in a different order, as desired or appropriate.

FIG. 2 is a flow chart showing a method for electronic coupon management, according to an embodiment. A user can scan the QR code of a coupon in a newspaper or other publication, such as with a mobile device, as shown in step 201. Alternatively, the user can simply click on a coupon on a web site.

Scanning the QR code can start an app 124 in the mobile device, as shown in step 202. The app 124 can facilitate storage, organization, and use of coupon according to the electronic coupon management system.

The app asks the user if the user wants all of the coupons in the newspaper, as shown in step 203. The user can respond with a "yes" or "no" selection. The user can respond with an indication that the user selected ones of the coupons. Thus, the coupons can be filtered manually or according to a user or system provided criteria.

The app 124 can cooperate with the server 130 to communicate the desired coupons to the mobile device 120, as shown in step 204. The app 124 can cooperate with the server 130 to communicate the desired coupons to the merchant device 110, to the server 130, or to any other device.

The user can make a purchase at a POS, as shown in step 205. The POS can be a payment provider POS or a POS of any entity that accommodates the electronic coupon management system. Alternatively, the POS can be a POS of an entity that does not accommodate the electronic coupon management system, as discussed herein.

The merchant device 110 can cooperate with the user device 120 to apply eligible coupons to the purchase, as shown in step 206. For example, as the user check out at the POS, the merchant device 110 can cooperates with the user device 120 to apply eligible coupons to the purchase.

The merchant device 110 can cooperate with the payment server 130 to process the coupons, as shown in step 207. Processing the coupons can include applying the coupons to the users purchase and/or crediting the user and/or merchant for any money owed thereto as a result of coupon usage.

FIG. 3 is a flow chart showing further detail of the method for electronic coupon management, according to an embodiment.

One or more memories can store an account of a user and the account can include coupon information for the user, as shown in step 301. One or more processors can receive a first communication including an indication of a desire of the user to purchase a product from a merchant, as shown in step 302. The one or more processors can access the account of the user, as shown in step 303. The one or more processors can determine, at least in part from the coupon information, if the user has any valid coupons for the product, as shown in step 304. The one or more processors can send a second communication including information regarding the coupon(s) for the product to facilitate use of the coupon(s) to purchase the product, as shown in step 305.

In implementation of the various embodiments, embodiments of the invention can comprise a personal computing device, such as a personal computer, laptop, PDA, cellular phone or other personal computing or communication devices. The payment provider system can comprise a network computing device, such as a server or a plurality of servers, computers, or processors, combined to define a computer system or network to provide the payment services provided by a payment provider system.

In this regard, a computer system can include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component can comprise a database having one or more disk drive components.

The computer system can perform specific operations by processor and executing one or more sequences of one or more instructions contained in a system memory component. Such instructions can be read into the system memory component from another computer readable medium, such as static storage component or disk drive component. In other embodiments, hard-wired circuitry can be used in place of or in combination with software instructions to implement the invention.

Payment processing can be through known methods, such as transaction details being communicated to the payment provider through the app, the payment provider processing the details, which can include user account and identifier information and authentication, merchant information, and transaction details. The user account can be accessed to determine if any restrictions or limitations can prevent the transaction from being approved. If approved, the payment provider can send a notification to the merchant and/or the user.

Figure 4:
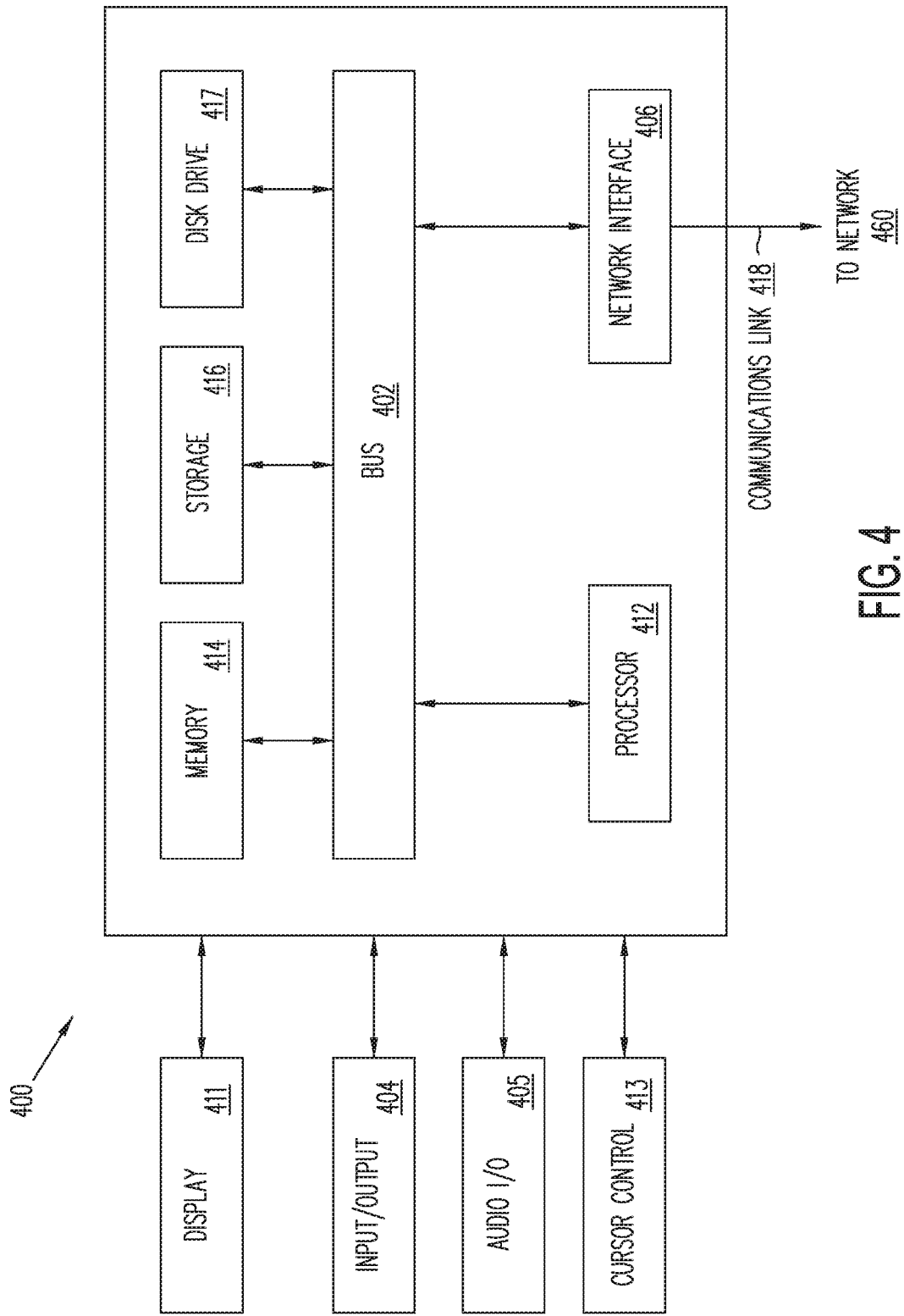
FIG. 4 is a block diagram of an example of a computer that is suitable for use in the system for electronic coupon management, according to an embodiment.

FIG. 4 is a block diagram of a computer system 400 suitable for implementing one or more embodiments of the present disclosure. In various implementations, the PIN pad and/or merchant terminal can comprise a computing device (e.g., a personal computer, laptop, smart phone, tablet, PDA, Bluetooth device, etc.) capable of communicating with the network. The merchant and/or payment provider can utilize a network computing device (e.g., a network server) capable of communicating with the network. It should be appreciated that each of the devices utilized by users, merchants, and payment providers can be implemented as computer system 400 in a manner as follows.

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 can also include an output component, such as a display 411 and a cursor control 413 (such as a keyboard, keypad, mouse, etc.). An optional audio input/output component 405 can also be included to allow a user to use voice for inputting information by converting audio signals. Audio I/O component 405 can allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods can also be suitable. A processor 412, which can be a micro-controller, digital signal processor (DSP), or other processing component, processes these various signals, such as for display on computer system 400 or transmission to other devices via a communication link 418. Processor 412 can also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic can be encoded in a computer readable medium, which can refer to any medium that participates in providing instructions to processor 412 for execution. Such a medium can take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media can take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention can be performed by a computer system. In various other embodiments, a plurality of computer systems coupled by a communication link (e.g., LAN, WLAN, PTSN, or various other wired or wireless networks) can perform instruction sequences to practice the invention in coordination with one another. Modules described herein can be embodied in one or more computer readable media or be in communication with one or more processors to execute or process the steps described herein.

A computer system can transmit and receive messages, data, information and instructions, including one or more programs (i.e., application code) through a communication link and a communication interface. Received program code can be executed by a processor as received and/or stored in a disk drive component or some other non-volatile storage component for execution.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the scope of the present disclosure. In addition, where applicable, it is contemplated that software components can be implemented as hardware components and vice-versa—for example, a virtual Secure Element (vSE) implementation or a logical hardware implementation.

Software, in accordance with the present disclosure, such as program code and/or data, can be stored on one or more computer readable and executable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Figure 6:
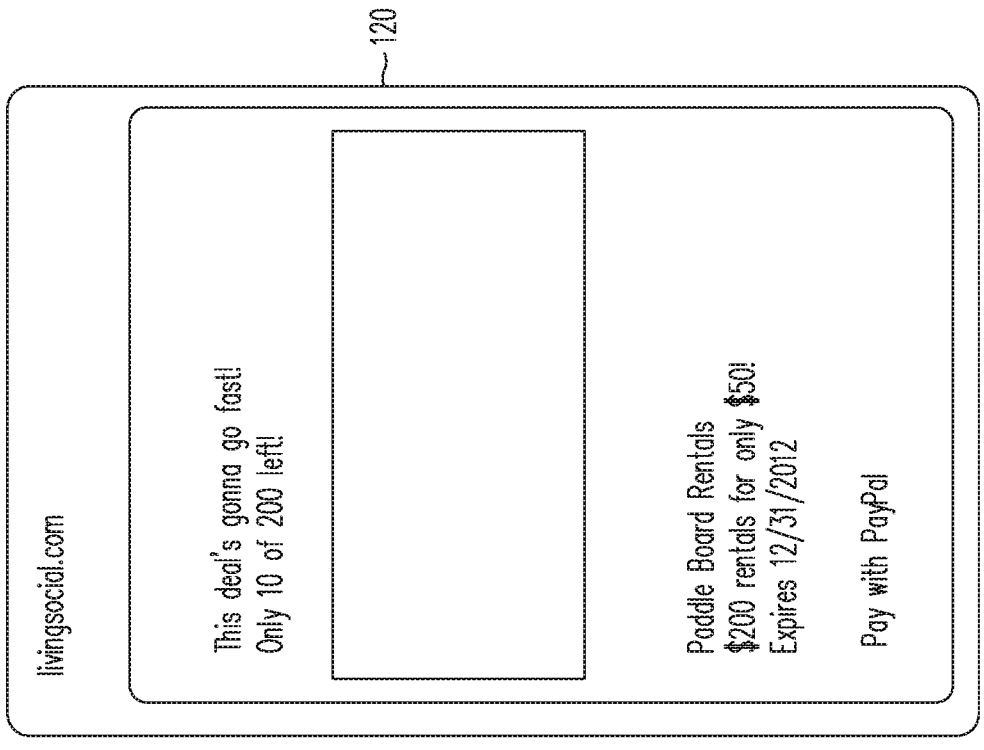
Figure 5:
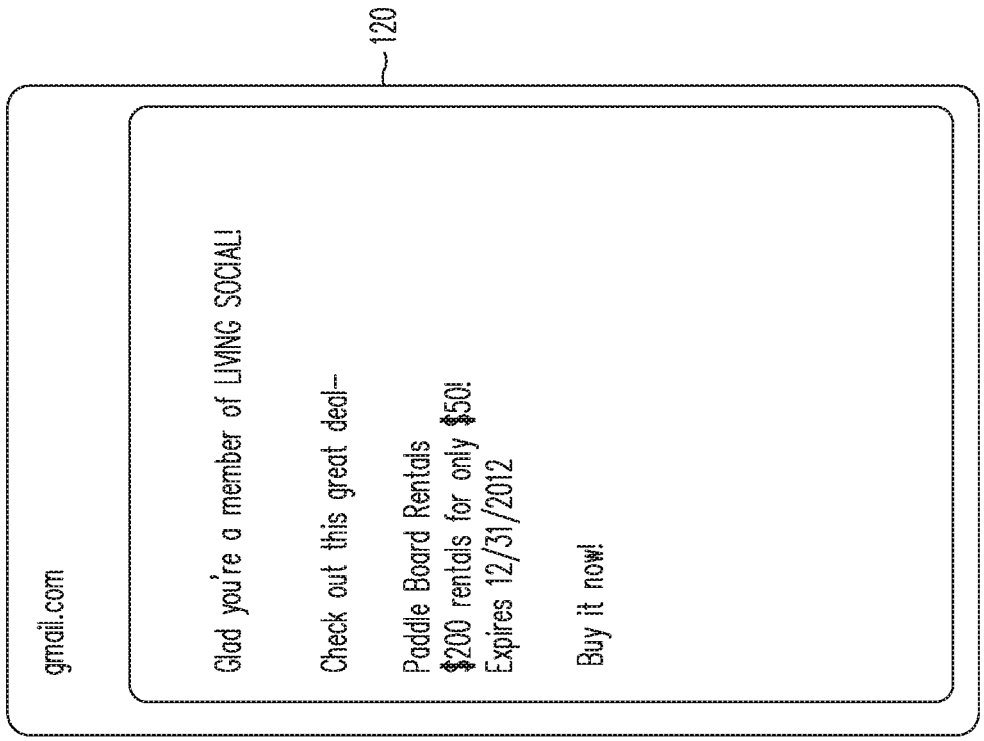
Figure 7:
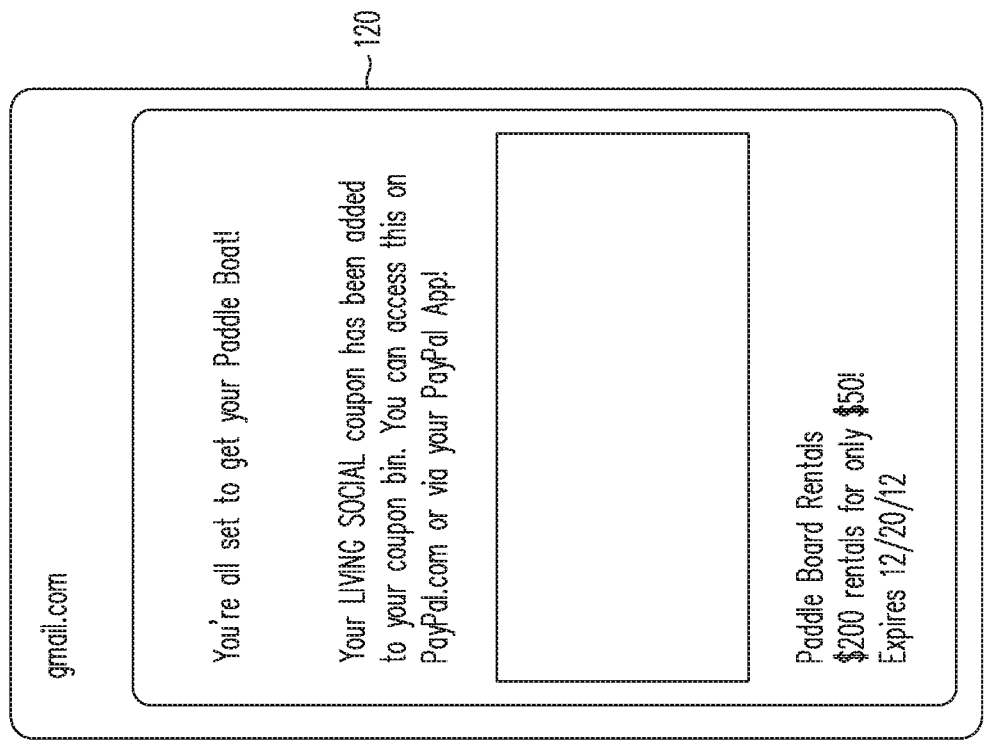

Referring now to FIGS. 5-9, an example of an embodiment is shown and discussed below. A user can read an email on the user's mobile device 120, as shown in FIG. 5. The user can notice that there is a great deal on Living Social for paddle board rentals, as shown in FIG. 6. The user can print the coupon, signs up for the deal online, and use a payment provider account to pay online for the rental. Within minutes, the user can get an email from the payment provider indicating he has a new social coupon added for the paddle board rental as shown in FIG. 7. That weekend, the user can head to the lake to rent the paddle board. Unfortunately, in this example the printed coupon receipt gets soaked when the user falls in the water.

Figure 8:
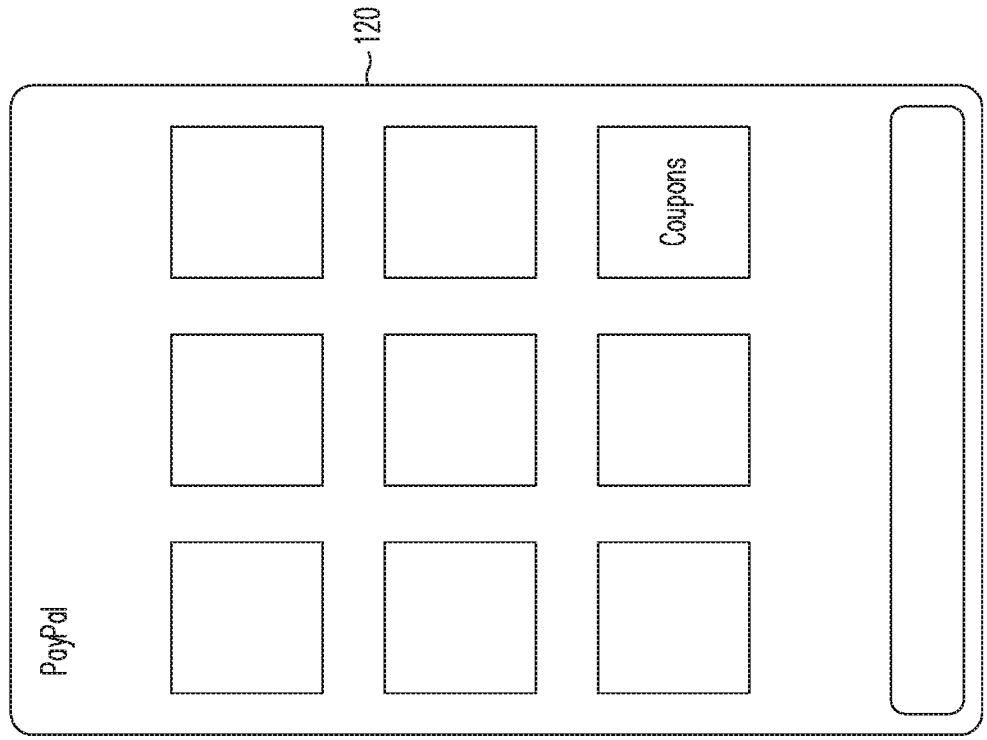
Figure 9:
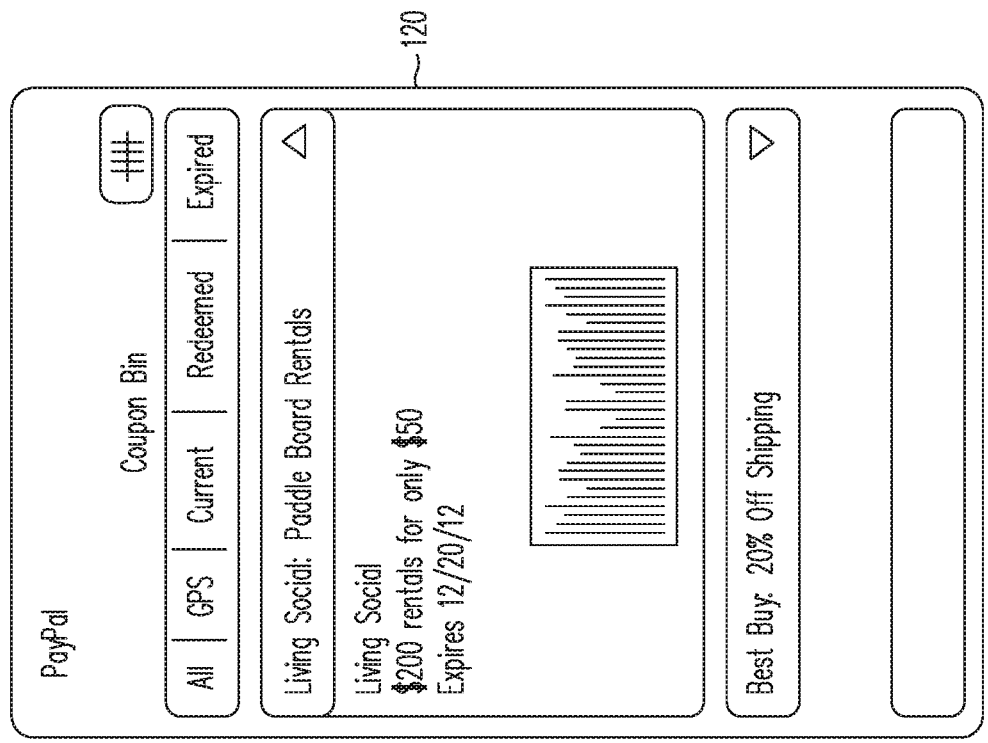

Fortunately, the user has a payment provider card and is able to use the social coupon stored in his payment provider account to present to the paddle board rental company. The user accesses coupons from his payment provider account, as shown in FIG. 8, to provide the coupon bin as shown in FIG. 9. The Living Social coupon for paddle board rental is in the coupon bin.

Referring now to FIGS. 10-19, another example of an embodiment is shown and discussed below. A user needs to shop for groceries. The user has been putting shopping off for two weeks and has a lot of shopping to do. Fortunately, the user has been looking through the Sunday paper each weekend and has been scanning payment provider branded manufacturer's coupons into her payment provider account using her smart phone. The user now has a nice bundle of coupons stored in her payment provider account for everything from shampoo to macaroni.

Figure 11:
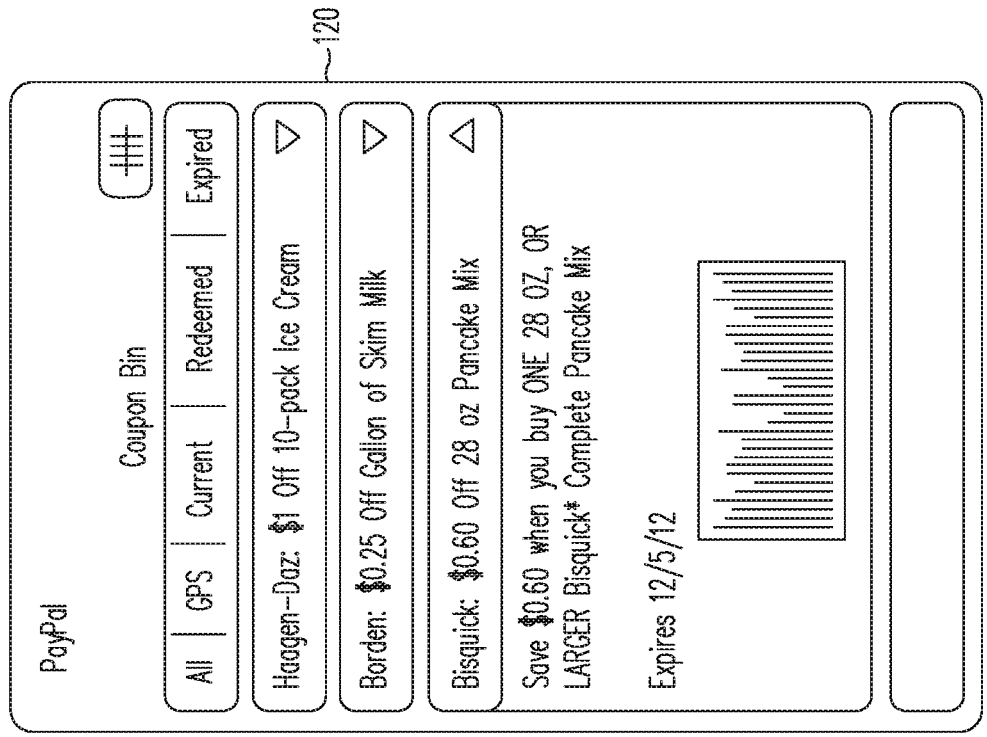
Figure 10:
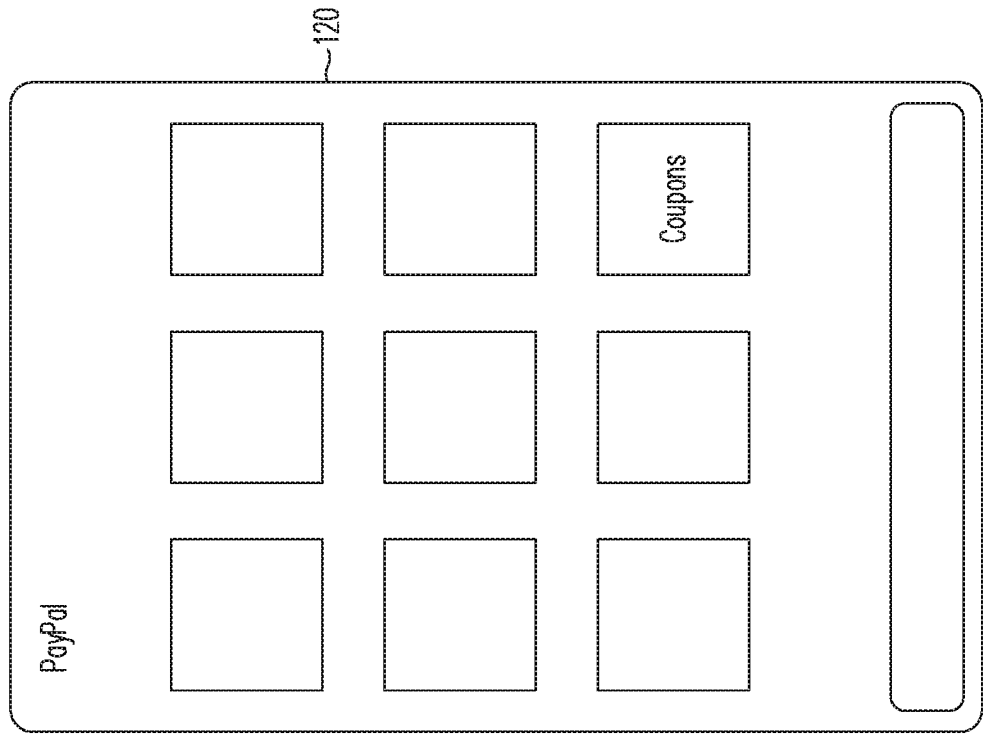

The user goes to the grocery store. When the user walks through the door, her smart phone, using the technology provided by Where, detects that the user is walking into her local grocery store, and automatically retrieves a bundle of additional coupons that her grocer is providing through her grocer's payment provider account. The user then pulls out her smart phone and selects coupons from the payment provider app, e.g., the PayPal app, as shown in FIG. 10. The user can review the available coupon in the coupon bin of the app, as shown in FIG. 11. The displayed coupons can be filtered by coupon type, expiration date, merchant, manufacturer, or any other criteria. The details regarding any coupon can be displayed, as desired.

The user proceeds to shop. After loading up her cart, she heads to the checkout line. When it comes time to pay, the user uses a payment provider card to pay for the goods.

Figure 13:
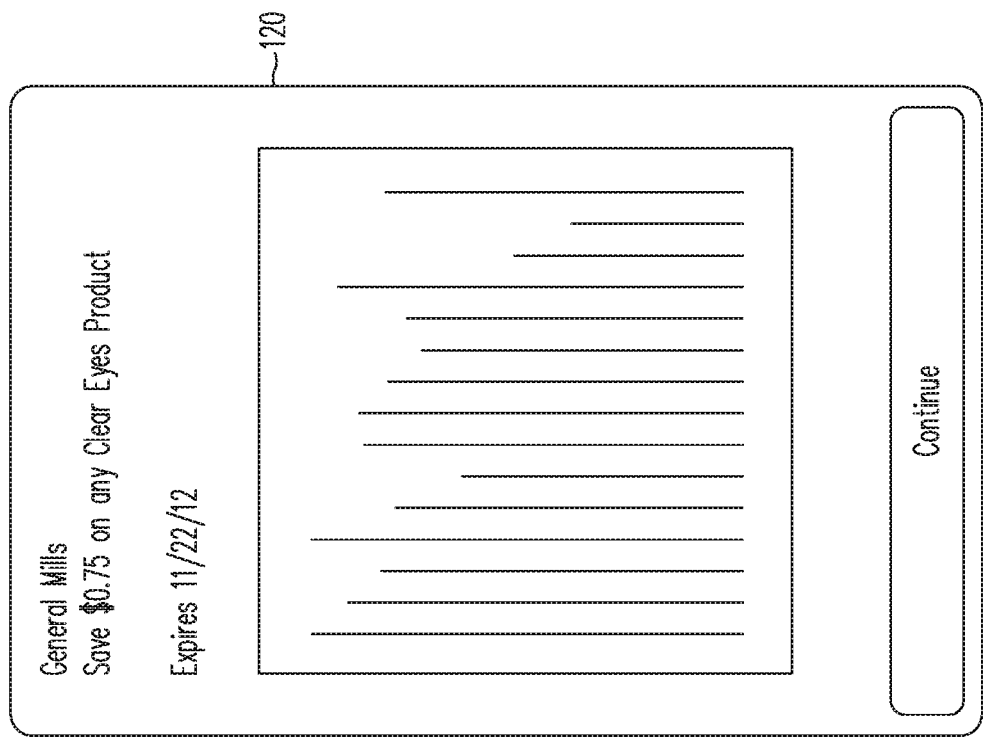
Figure 12:
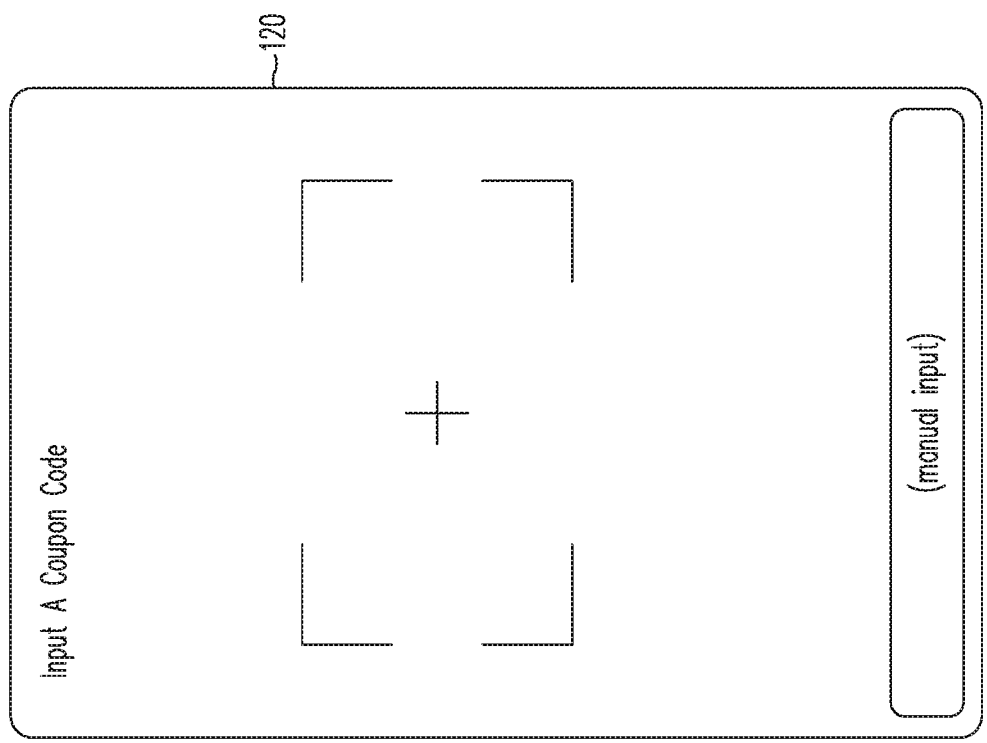

The user can scan any coupons as shown in FIG. 12. Scanning a coupon barcode can launch the app to facilitate scanned entry of coupons into the bin or manual entry of coupons into the bin. For example, paper coupons can be scanned into the user's mobile device 120 via the payment provider app 124. When a coupon barcode has been captured, the screen of the user device 120 can flash. Coupons can be entered into the bin manually by selecting "manual input" and typing in the coupon code into the user device 120. An entered coupon can be displayed, as shown in FIG. 13.

Figure 15:
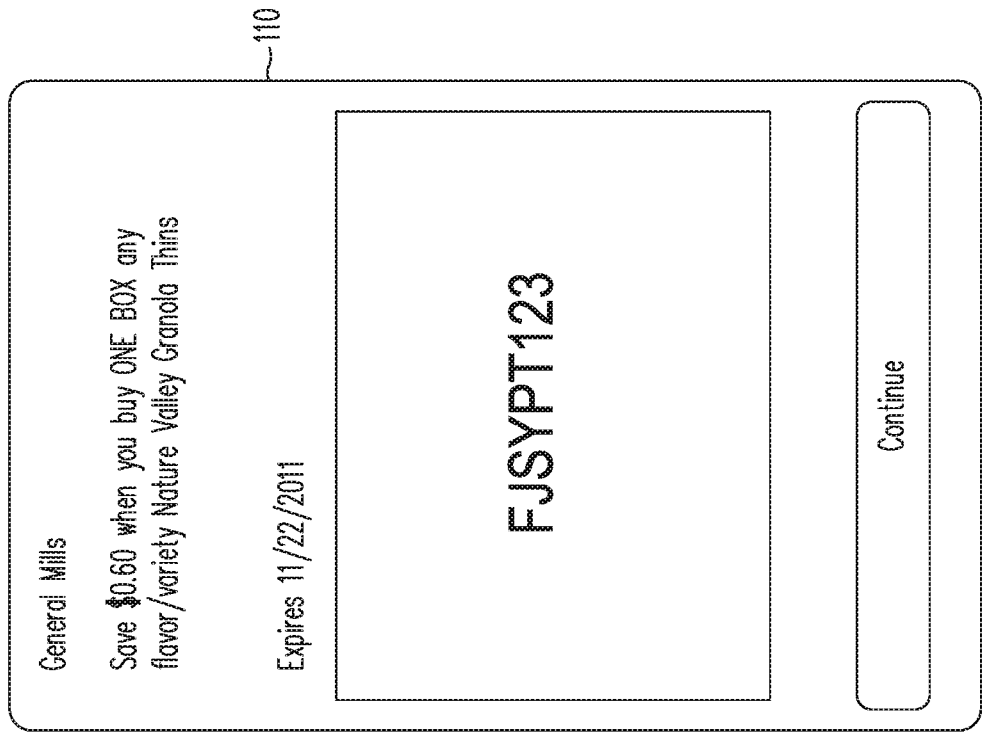
Figure 14:
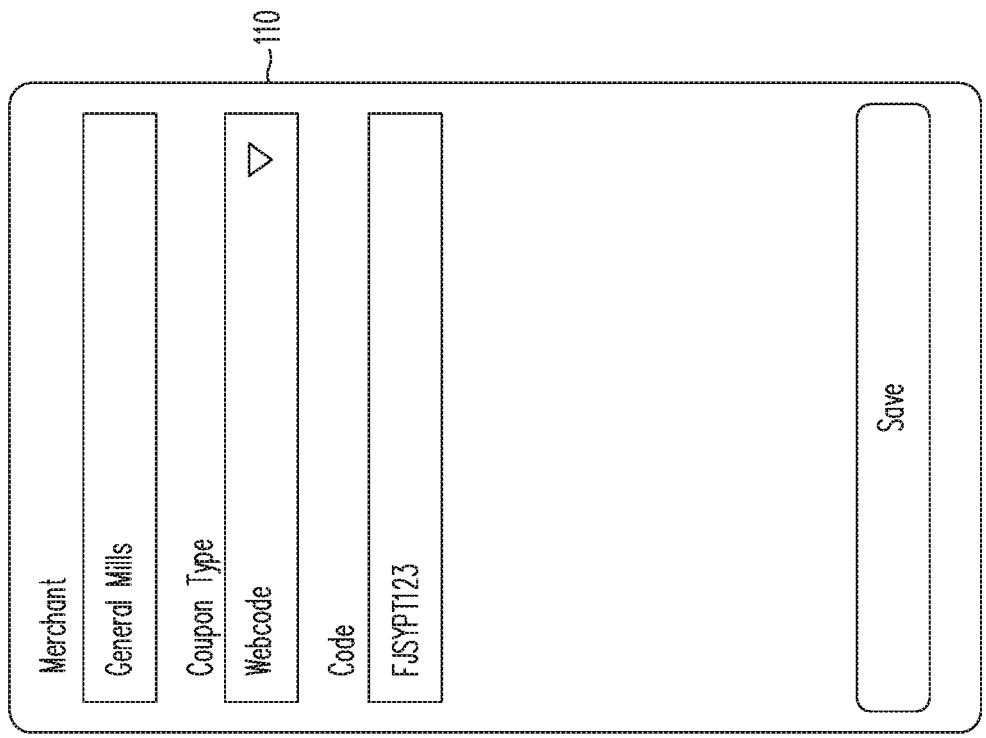

In this instance, the grocer has a new payment provider POS system, and once the user swipes the payment provider card, all of the user's coupons pop up on the screen of the POS system and/or the screen of the user's smart phone. The payment provider POS includes the merchant device 110, as shown in FIG. 14. The merchant can press the "Use All Coupons" button on the screen of the merchant device 110 of the POS system (such as with the user's approval) and/or the user can press the "Use All Coupons" button on the screen of the user's smart phone. Information regarding a coupon can be shown on the merchant device 110, as shown in FIG. 15. The user's bill is reduced dramatically when the coupons are applied, as indicted on the screen of the POS system and/or the screen of the user's smart phone.

Figure 17:
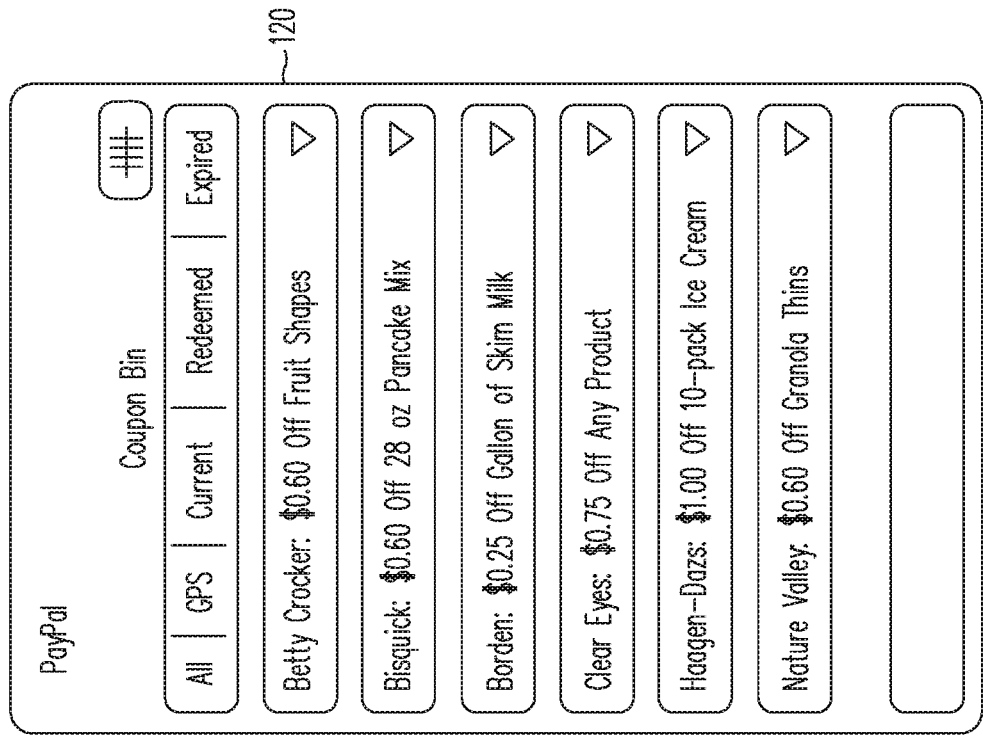
Figure 16:
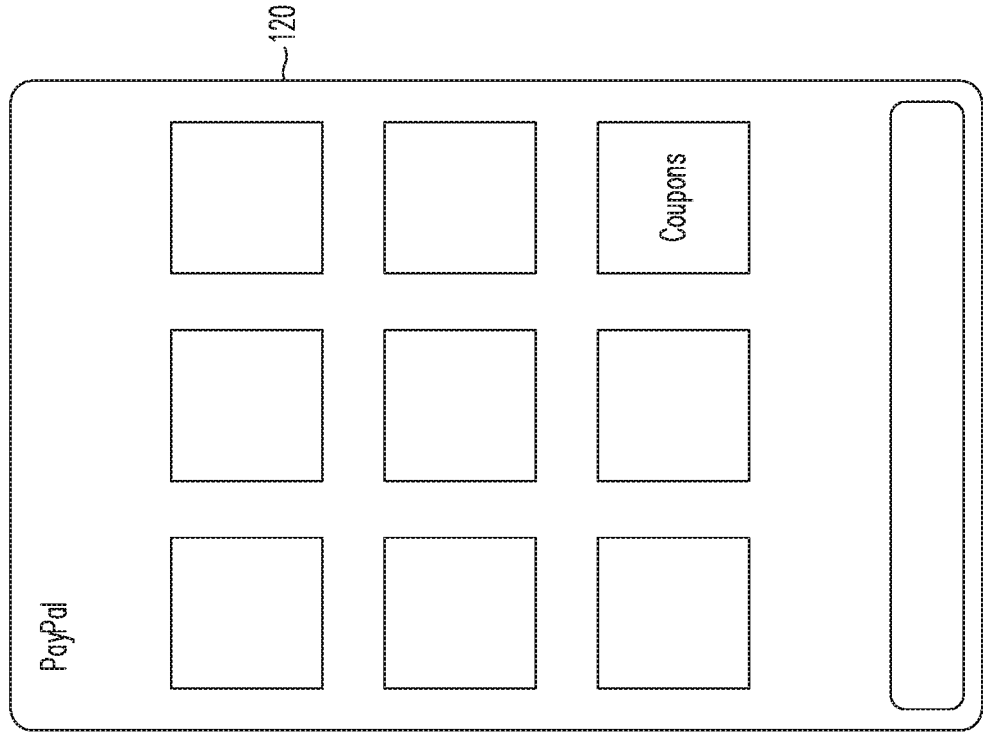

The user can select "coupons" at any time, as shown in FIG. 16. Selecting "coupons" can display the coupon bin, as shown in FIG. 17. Selecting a particular coupon can display further information regarding that coupon.

The user then heads home with a bundle of groceries and a smile knowing that she just received a great deal because she used the payment provider's electronic coupon management system. Meanwhile, the grocer is pleased because the grocer knows that all of the coupons used in the purchase are valid and they are able to submit the coupons to the manufacturer using the purchase provider, so that they can obtain an instant coupon redemption Referring now to FIGS. 20-29, yet another example of an embodiment is shown and discussed below. The user decides to go on a fishing trip. The user goes online and finds a few good payment provider branded coupons for fishing equipment. He clicks the links for each coupon, and adds the coupons to his payment provider electronic coupon management account. An example of a payment provider branded coupon 1801 is shown in FIG. 18. The user jumps in his truck and drives to the local sporting goods store.

Unfortunately the sporting goods store he chose does not have a payment provider account, and does not have a payment provider POS. The user simply swipes a payment provider card 1901 to pay for the goods, as shown in FIG. 19. Even though the sporting goods store may show a full bill, the user knows that when he goes home, the will see that the payment provider has redeemed the coupons for him, and that the resulting refund has already shown up in his payment provider account. The user is happy, knowing that he just saved money by using the payment provider account.

Figure 21:
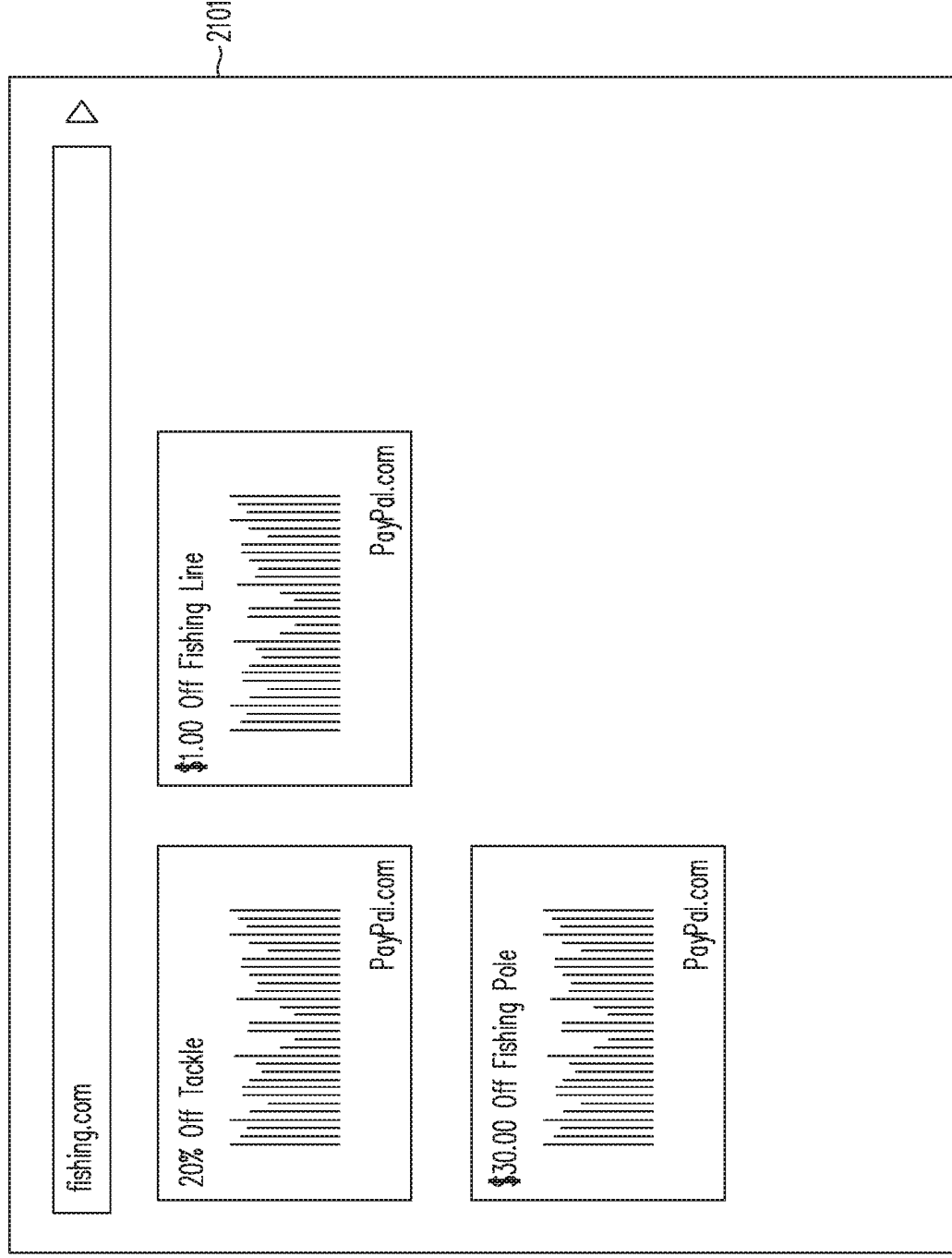
Figure 22:
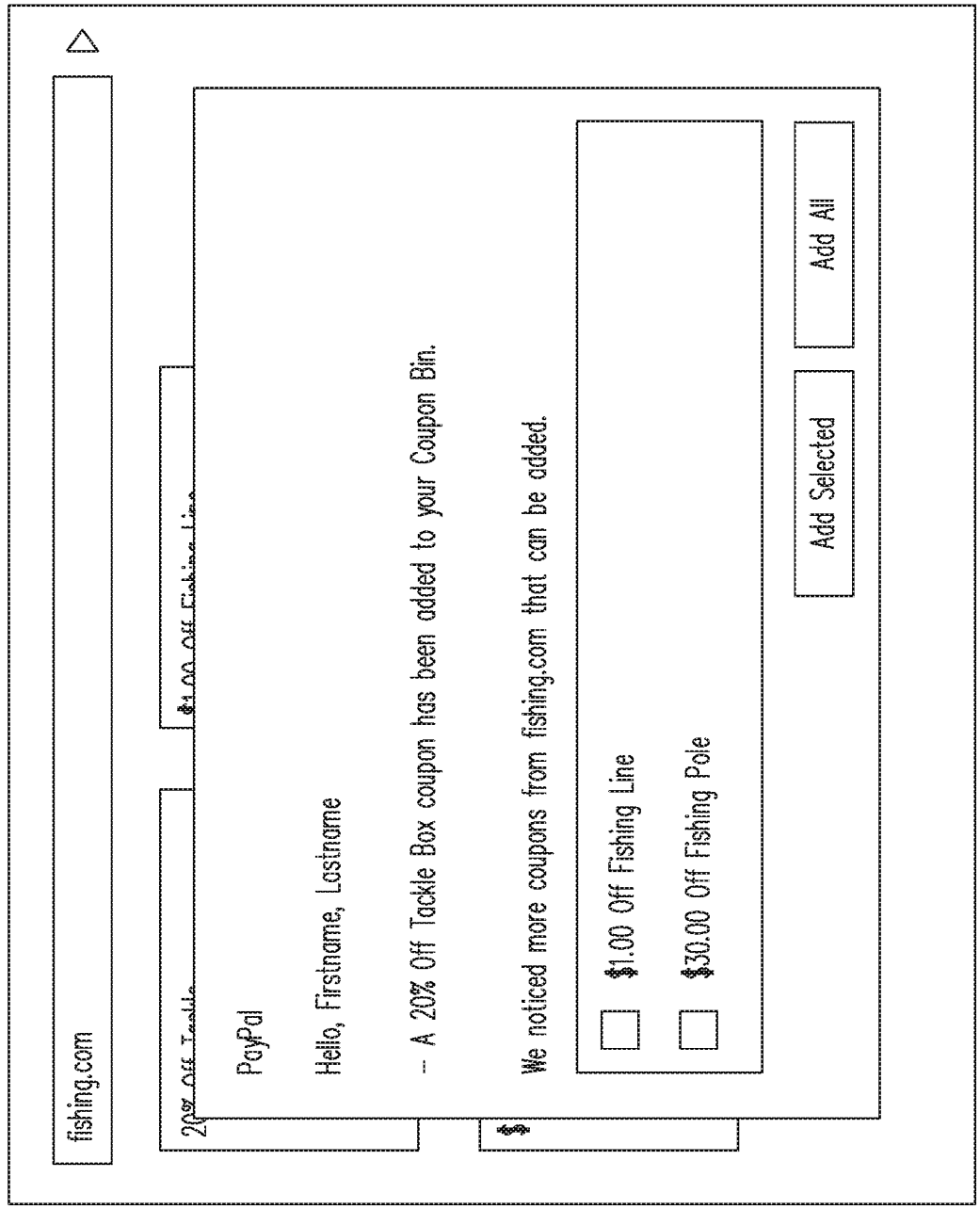
Figure 23:
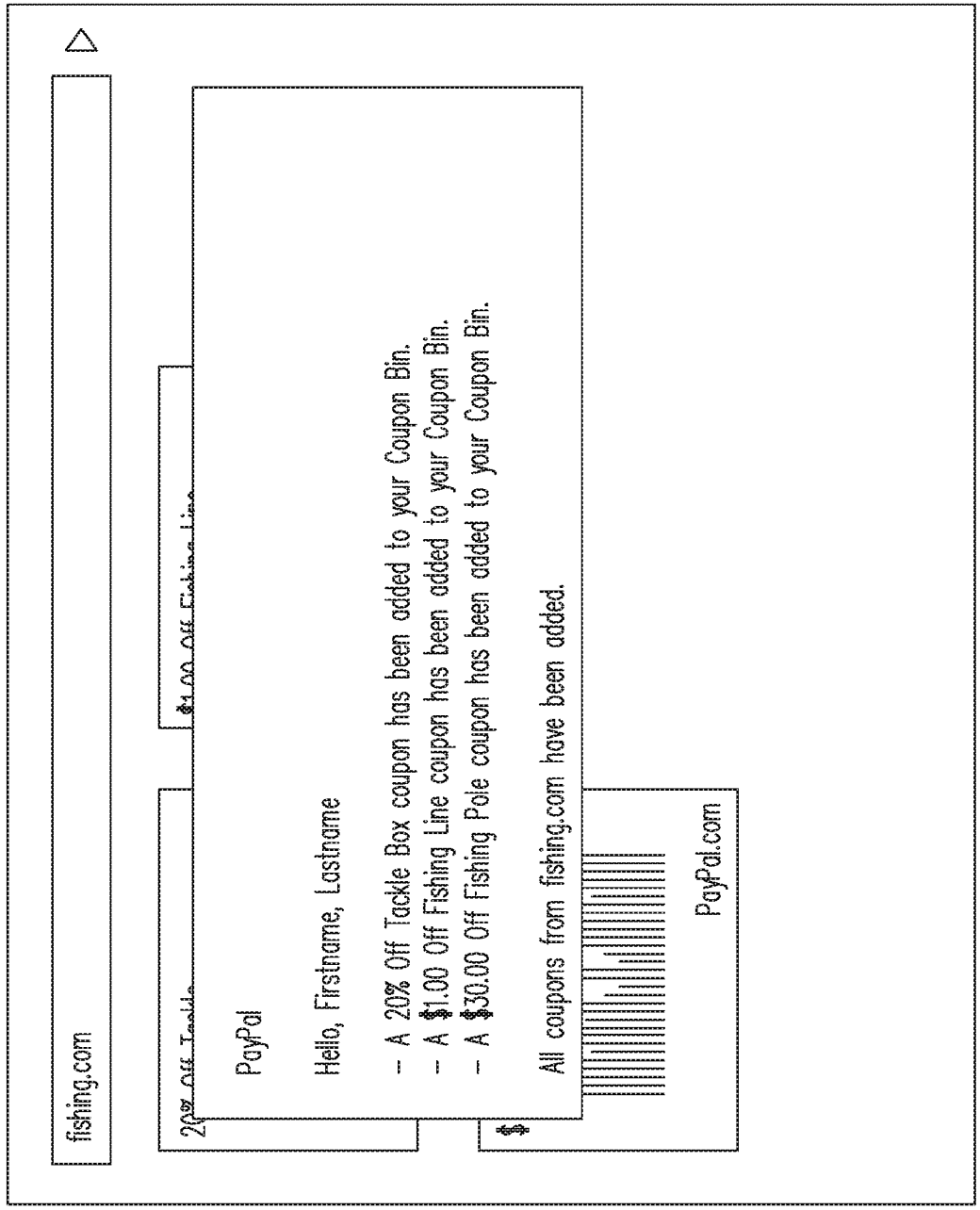

The payment provider can provide a display 2001, such as upon the user's mobile device 120, that lists the coupons used in the user's purchase transaction at the sporting goods store, as shown in FIG. 20. From this screen, the user can elect to apply all of the coupons to the purchase transaction, if desired. The coupons can be show in further detail on a display 2101, as shown in FIG. 21. The user can be notified by the payment provider that a coupon has been applied to the purchase transaction and that further coupons are eligible to be applied to the transaction, as shown in FIG. 22. The user can select which, if any, of the further coupons to apply to the transaction, as also shown in FIG. 22. The user can be presented with a final listing of all of the coupons applied by the payment provider to the purchase transaction, as shown in FIG. 23. Coupon used and coupons not used can be indicted in the listing.

The user can be required to swipe the payment provider card 1901, as shown in FIG. 19, sign and/or provide a personal identification number (PIN), such as via the merchant device 110, as shown in FIG. 24. The merchant can provide a receipt 2601 to the user, as shown in FIG. 25. The user can review general payment provider account information, such as that of display 2701 in FIG. 26, on the mobile device 120 or on any other device. The user can review specific payment transaction information, such as that of display 2801 in FIG. 27, on the mobile device 120 or on any other device.

As used herein, the term "store" can include any business or place of business. The store can be a brick and mortar store or an online store. The store can be any person or entity that sells a product.

As used herein, the term "product" can include any item or service. Thus, the term "product" can refer to physical products, digital goods, services, or anything for which a user can make a payment, including charitable donations. A product can be anything that can be sold. Examples of products include cellular telephones, concerts, meals, hotel rooms, automotive repair, haircuts, digital music, and books. The product can be a single item or a plurality of items. For example, the product can be a tube of toothpaste, a box of laundry detergent, three shirts, and a donut.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers.

As used herein, the term "network" can include one or more local area networks (LANs) such as business networks, one or more wide area networks (WANs) such as the Internet, one or more cellular telephone networks, or any other type or combination of electronic or optical networks.

As used herein, the term "card" can refer to any card or other device that can be used to make a purchase in place of cash. For example, the card can be a bank card, credit card, debit card, gift card, or other device. The card can be a token, such as a hardware token or a software token. The card can be stored in and/or displayed upon a user device, such as a cellular telephone. Coupons can, for example, be stored on or associated with a card.

As used herein, the term "coupon" can include any incentive offered by a merchant or the like and redeemable, usable, or exercisable by a customer, user, or other person. Examples of coupons can be paper coupons (such as those provided in newspapers, magazines, and mailers), digital or virtual coupons (such as those offered electronically such as via the Internet, such as via web sites (such as social coupons), social networks, social media, email, text messaging, and the like), and devices (such as hardware tokens, mobile devices, and cellular telephones within which coupons, such as virtual coupons can be stored). Generally, coupons will provide discounts or other incentives to purchase products or come to a merchant's store. Incentives can include coupons, rebates, discounts, and the like. As used herein, the term "coupon" can refer to rebates, discounts, and other incentives. As used herein, the term "coupon" can include information regarding or representative of a coupon.

Use of the term "QR code" herein is by way of example only, and not by way of limitation. Various other types of codes or indicia are contemplated. For example, a bar code, stock keeping unit (SKU), radio frequency identification (RID), or any other type of code or indicator can be used. Any combination of codes can be used.

Users can save time since they don't have to look for and clip coupons and don't have to look for and apply coupons while checking out at a POS. Users no longer have to be concerned with organizing and storing paper coupons. Rebates can be provided to customers substantially instantaneously, such as directly into an account of the user (such as a bank account, credit card account, or payment provider account).

As used herein, the term "publication" can include any source of information that can include coupons. Examples of publications include newspapers, magazines, advertisements, billboards, flyers, mailings, websites, emails, text messages, and the like.

Merchants can save time since they don't have to individually handle, e.g., scan, and process coupons. Thus, both users and merchants can benefit substantially from the electronic coupon management system discussed herein.

Thus, a service system can be provided to user wherein the service stores coupon information, such as via scan or social codes that can be entered or scanned by the user. The codes can be scanned, for example, using the smart phone of the user. Customers can maintain, store, manage, filter, and use the coupons via a website of the service or system and/or via their smart phone. The merchant is not required to have a payment provider POS system or to participate in the disclosed system. For example, coupons can be printed by the user and used at the POS or can be displayed on a screed of the user's smart phone for use at the POS.

Further, if the merchant does not participate in the system, then the user can submit coupons to the manufacturer. The user can then be reimbursed or rebated the coupon amount by the manufacturer. In this manner, the user can be paid quickly for use of the coupons.

Merchants who have a payment provider account can process the coupons via the payment provider account. A payment provider POS system is not necessary. The payment provider can then submit the coupons to the manufacturer. Merchants can be credited substantially immediately for coupon that they receive.

GPS, a payment provider POS, and Where technology can be integrated to provide merchants with a simple and quick way for their customers to save money and to provide manufacturers with a better ability to target their products. For example, users can view their stored coupons, such as for a particular manufacturer and can be presented with an amount that the user will save if all or selected coupons (such as from the particular manufacturer) are used.

Coupons can be provided automatically to a user's account. For example, local merchants can add coupons to a user's account. A watch program can look for specified types of coupons and can add the specified types of coupons to the users account. Users can be notified when coupons are added to the user's account. Rebates for the use of coupons can be added directly to a user's bank, credit card, payment provider, or other account.

Users can organize their coupons, as desired. For example, users can organize their coupons according to manufacturer, product, product category (such as toiletries, clothing, food, etc.), expiration date, expected date of use, and/or any other desired criteria. Since the coupons are stored electronically, they can be indexed and/or organized in multiple categories. For example, the coupons can be organized according to both product and expiration date. An alarm can be provided when the expiration date of any, all, or selected coupons is near. For example, the user's smart phone can vibrate, sound, and/or provide a message when a selected coupon is within three days of expiration.

The actual use of coupons and the money saving associated therewith can be easily monitored and provided to the user. For example, the user can obtain weekly, monthly, yearly, and total (since beginning use of the system) coupon savings reports.

Customers can trade, exchange, copy, move, or give coupons to one another. This can be accomplished by NFC, for example. This can be done by any other type of communication, such as text messaging, email, or other Internet communication.

The electronic coupon management system reduces hand processing, speed up rebates or payment for coupons, and makes obtaining coupons easy and fun. The user no longer has to clip coupons. Merchants and manufacturers no longer have to be concerned with receiving bad (e.g., invalid, expired, or counterfeit) coupons. Thus, the electronic coupon management system benefits the users, merchants, and manufacturers.

The electronic coupon management system can provide a service that stores coupon information for the customer via scan or social codes entered, such as by the customer. If the merchant doesn't have a payment provider POS or other system for scanning coupons for the system, then the coupon code, e.g., barcode, can be scanned using the customer's mobile device, e.g., smart phone. Customers can maintain their coupons via an electronic coupon management system website or can maintain the coupons on their mobile device.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes can be made in form and detail without departing from the scope of the invention. Thus, the invention is limited only by the claims.

What is claimed is:

1. A system comprising:
a non-transitory memory; and
one or more hardware processors coupled to the non-transitory memory and configured to read instructions from the non-transitory memory to cause the system to perform operations comprising:
receiving, via a network from a customer device of a user, a transaction request for purchasing an item from a merchant using a point of sale (POS) device;
determining, from the transaction request, a code scanned by the customer device for the merchant and a digital token for a digital wallet of the user;
identifying, based on the digital token received from the customer device, a user account associated with the digital wallet of the user;
extracting coupon data from the scanned code using an image data processing operation;
identifying the coupon data for the digital wallet based on the scanned code for the merchant and the item being purchased;
determining, from the identified coupon data and user preferences of the user for a coupon usage with the transaction request, an optimal coupon for the item during a checkout process with the merchant at the POS device;
generating a digital application notification based on the optimal coupon;
sending, via the network, the digital application notification for the optimal coupon to the POS device of the merchant;
applying the optimal coupon to the checkout process at the POS device that reduces a purchase price of the item during the checkout process;
processing the transaction request for purchasing the item at the POS device, the transaction being processed using the digital wallet and the optimal coupon;
transmitting a digital version of the optimal coupon to the customer device of the user over the network;
receiving a request to share the digital version with another device of a different user; and
transmitting, via a digital communication platform on the network, the digital version from the customer device to the other device based on the request, wherein the digital version is deleted from the customer device during or after the transmitting the digital version from the customer device to the other device.

2. The system of claim 1, wherein the operations further comprise:

determining, upon completion of the checkout process, a rebate for the item; and processing the rebate using information provided by the digital wallet.

3. The system of claim 2, wherein the rebate is provided by a third-party provider, and wherein processing the rebate using the information provided by the digital wallet comprises processing the rebate with the third-party provider.

4. The system of claim 1, wherein determining the optimal coupon comprises validating the optimal coupon.

5. The system of claim 1, wherein the optimal coupon is determined based on providing a largest saving.

6. The system of claim 1, wherein the user preferences include at least one of a geographic area for available merchants offering the item, a distance from a location set by the user for the available merchants, or a predefined time period for valid coupons usable by the user for the item.

7. The system of claim 1, wherein the user preferences are determined based on a transaction history of the user included in the user account.

8. A computer-implemented method comprising:

receiving, by a server via a network from a customer device of a user, a transaction request for purchasing one or more items from a merchant using a point of sale (POS) device;

determining, from the transaction request, a code scanned by the customer device for the merchant and a digital token for a digital wallet of the user;

identifying, based on the digital token received from the customer device, a user account associated with the digital wallet of the user;

determining user preferences for coupons based on the identified user account;

based on the user preferences, identifying a coupon publication selected by the user;

extracting coupon data from the scanned code using an image data processing operation;

identifying the coupon data for the digital wallet based on the scanned code for the merchant, the one or more items being purchased, and the user preferences, wherein the coupon data is associated with the coupon publication;

selecting a first coupon from coupon publication based on the user preferences and the coupon data;

generating a digital application notification based on the coupon data;

sending, via the network, the digital application notification for the identified coupon data from the server to the POS device of the merchant, wherein the digital application notification identifies the first coupon as a most preferred coupon based on the user preferences;

completing a transaction for purchasing the one or more items at the POS device, the transaction being completed using the digital wallet and a first coupon for the one or more items determined from the coupon data sent to the POS device;

determining, upon a completion of the transaction, that a second coupon for at least one of the one or more items exists, based on additional coupon data identified for the digital wallet of the user;

retroactively applying the second coupon to the transaction;

reconciling the transaction based on the application of the second coupon that provides a refund to the user account associated with the digital wallet;

transmitting a digital version of the second coupon to the customer device of the user over the network;

receiving a request to share the digital version with another device of a different user; and transmitting, via a digital communication platform on the network, the digital version from the customer device to the other device based on the request, wherein the digital version is inaccessible from the customer device during or after the transmitting the digital version from the customer device to the other device.

9. The method of claim 8, wherein the retroactive application of the second coupon to the transaction is processed without additional interaction from the customer device.

10. The method of claim 8, wherein determining that the second coupon for the at least one item of the one or more items exists includes receiving, from the user account associated with the digital wallet, the second coupon for application after the transaction has been completed.

11. The method of claim 8, further comprising determining that all conditions for use of the second coupon are met, wherein the second coupon is retroactively applied to the transaction upon the determining that all the conditions for use of the second coupon are met.

12. The method of claim 8, further comprising:

determining, upon the completion of the transaction, a rebate for the one or more items; and processing the rebate using information provided by the digital wallet.

13. The method of claim 12, wherein the rebate is provided by a third-party provider, and wherein processing the rebate using the information provided by the digital wallet comprises processing the rebate with the third-party provider.

14. A non-transitory machine-readable medium having stored thereon machine-readable instructions executable to cause a machine to perform operations comprising:

receiving, via a network from a customer device of a user, a transaction request for purchasing an item from a merchant using a point of sale (POS) device;

determining, from the transaction request, a code scanned by the customer device for the merchant and a digital token for a digital wallet of the user;

identifying, based on the digital token received from the customer device, a digital wallet of the user;

identifying coupon data for the digital wallet based on the scanned code for the merchant and the item being purchased;

determining, from the identified coupon data and user preferences of the user for a coupon usage with the transaction request, an optimal coupon for the item during a checkout process with the merchant at the POS device;

generating a digital application notification based on the optimal coupon;

sending, via the network, the digital application notification for the optimal coupon to the POS device of the merchant;

applying the optimal coupon to the checkout process at the POS device that reduces a purchase price of the item during the checkout process;

completing the transaction request for purchasing the item at the POS device, the transaction being completed using the digital wallet and the optimal coupon;

transmitting a digital version of the optimal coupon to the customer device of the user;

receiving a request to share the digital version with another device of a different user; and responsive to receiving the requesting, transmitting the digital version from the customer device to the other device using a digital communication platform on the network, wherein the digital version is made inactive on the customer device during or after the digital version is transmitted to the other device.

15. The non-transitory machine-readable medium of claim 14, wherein the operations further comprise:
determining, upon completion of the checkout process, a rebate for the item; and
processing the rebate using information provided by the digital wallet.

16. The non-transitory machine-readable medium of claim 15, wherein the rebate is provided by a third-party provider, and wherein processing the rebate using the information provided by the digital wallet comprises processing the rebate with the third-party provider.

17. The non-transitory machine-readable medium of claim 14, wherein determining the optimal coupon comprises validating the optimal coupon.

18. The non-transitory machine-readable medium of claim 14, wherein the optimal coupon is determined based on providing a largest saving.

19. The non-transitory machine-readable medium of claim 14, wherein the user preferences include at least one of a geographic area for available merchants offering the item, a distance from a location set by the user for the available merchants, or a predefined time period for valid coupons usable by the user for the item.

20. The non-transitory machine-readable medium of claim 14, wherein the user preferences are determined based on a transaction history associated with the digital wallet of the user.

\* \* \* \* \*